(12) United States Patent
Fydrych et al.

(10) Patent No.: US 12,715,707 B1
(45) Date of Patent: Aug. 25, 2026

(54) DETECTION SYSTEM FOR DETECTING CRACKS IN CONVEYOR BELT

(71) Applicant: Amazon Technologies, Inc., Seattle, WA (US)

(72) Inventors: Jaroslaw Robert Fydrych, Mierzyn (PL); Rafi Joseph Magholian, Duisburg (DE); Jaroslaw Talaska, Sobiemysl (PL); Wojciech Radziewicz, Weltyn (PL); Mohamed Hussien Metwaly Mohamed, Swindon (GB); Adam Piotr Jarocki, Szczecin (PL); Patrick Heimann, Munster (DE)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 18/756,785

(22) Filed: Jun. 27, 2024

(51) Int. Cl.
*B65G 43/02* (2006.01)

(52) U.S. Cl.
CPC ...... *B65G 43/02* (2013.01); *B65G 2203/0275* (2013.01); *B65G 2203/0283* (2013.01)

(58) Field of Classification Search
CPC ............ B65G 43/02; B65G 2203/0275; B65G 2203/0283
USPC ............................ 198/502.1, 810.02, 810.03
See application file for complete search history.

(56) References Cited

U.S. PATENT DOCUMENTS 8,127,918 B2 * 3/2012 Warner .................. B65G 43/02 198/840
2010/0025198 A1 * 2/2010 Wallace ................. B65G 43/02 198/810.02

FOREIGN PATENT DOCUMENTS

CN 116135744 A * 5/2023 ............. B65G 43/02
WO WO-2007000123 A1 * 1/2007 ............. B65G 43/02
WO WO-2018032040 A1 * 2/2018 ............. B65G 43/02

* cited by examiner

*Primary Examiner* — James R Bidwell
(74) *Attorney, Agent, or Firm* — Eversheds Sutherland (US) LLP

(57) ABSTRACT

A detection system monitors a conveyor belt for determining whether cracks are present in the conveyor belt. The detection system may determine a standard position of the conveyor belt as the conveyor belt rounds over a pulley, and a displacement position associated with detecting displacements of the conveyor belt as the conveyor belt rounds over the pulley. The detection system receives signal(s) from a sensor arranged adjacent to the pulley and determines that the signal is associated with a displacement of the conveyor belt beyond the displacement position. Based at least in part on the signal, the detection system may determine that the displacement is associated with a crack in the conveyor belt.

19 Claims, 13 Drawing Sheets

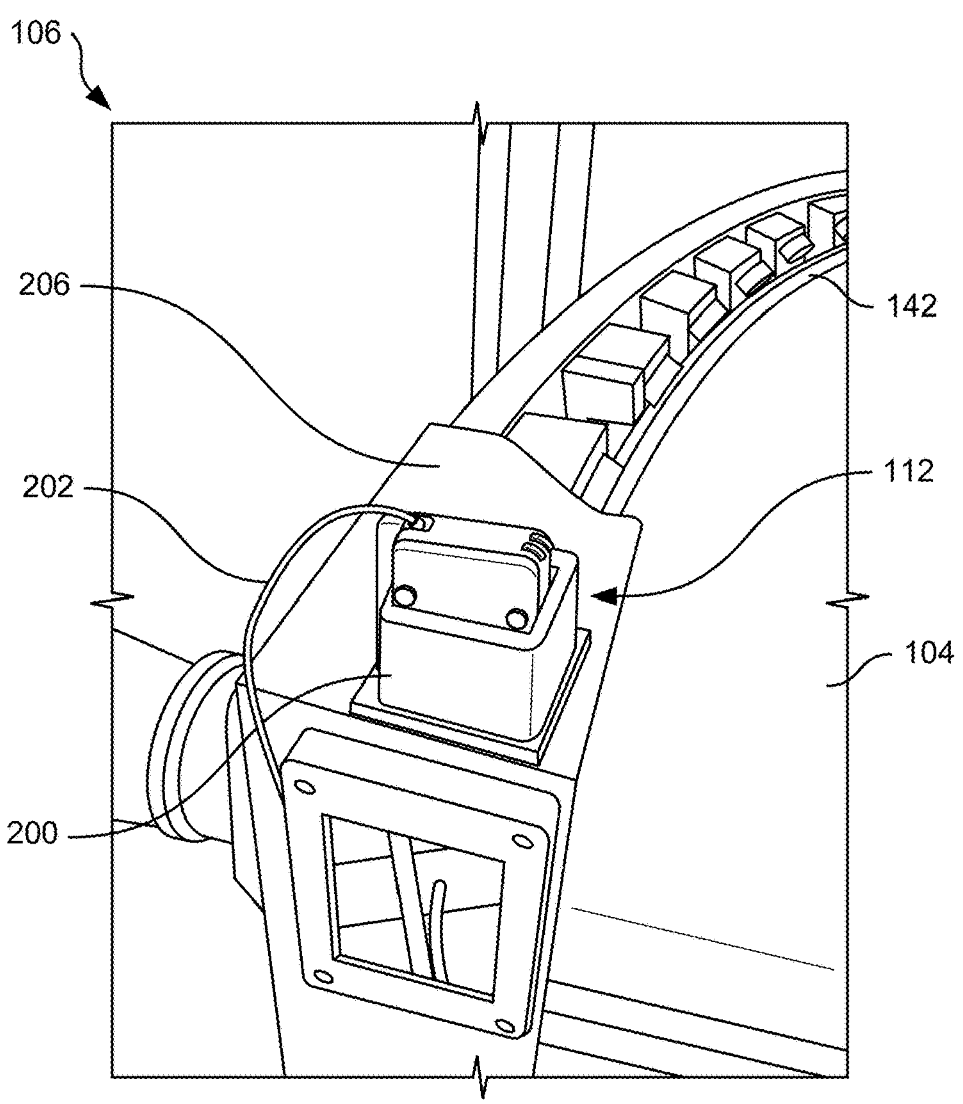
FIG. 2A
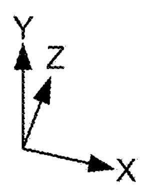

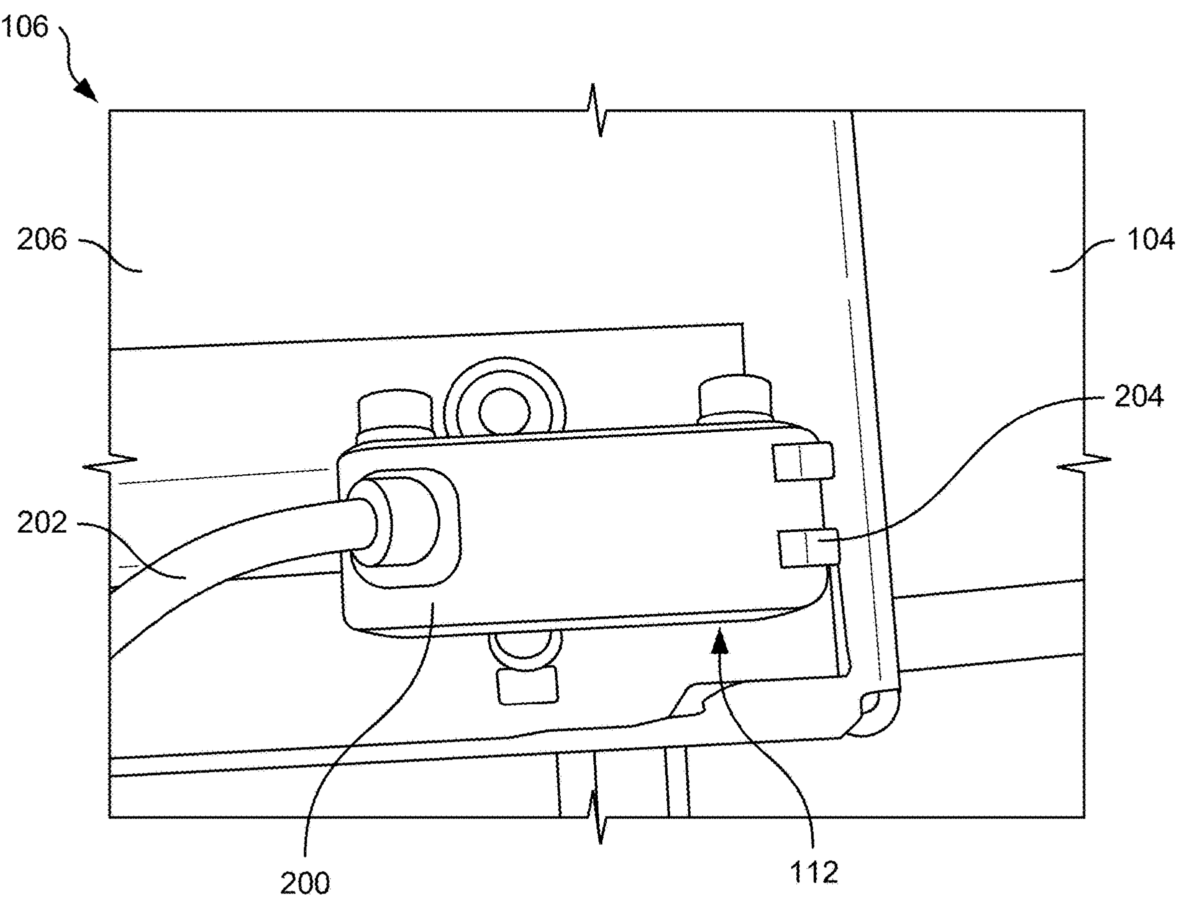
FIG. 2B
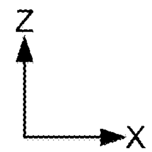

Y
Z

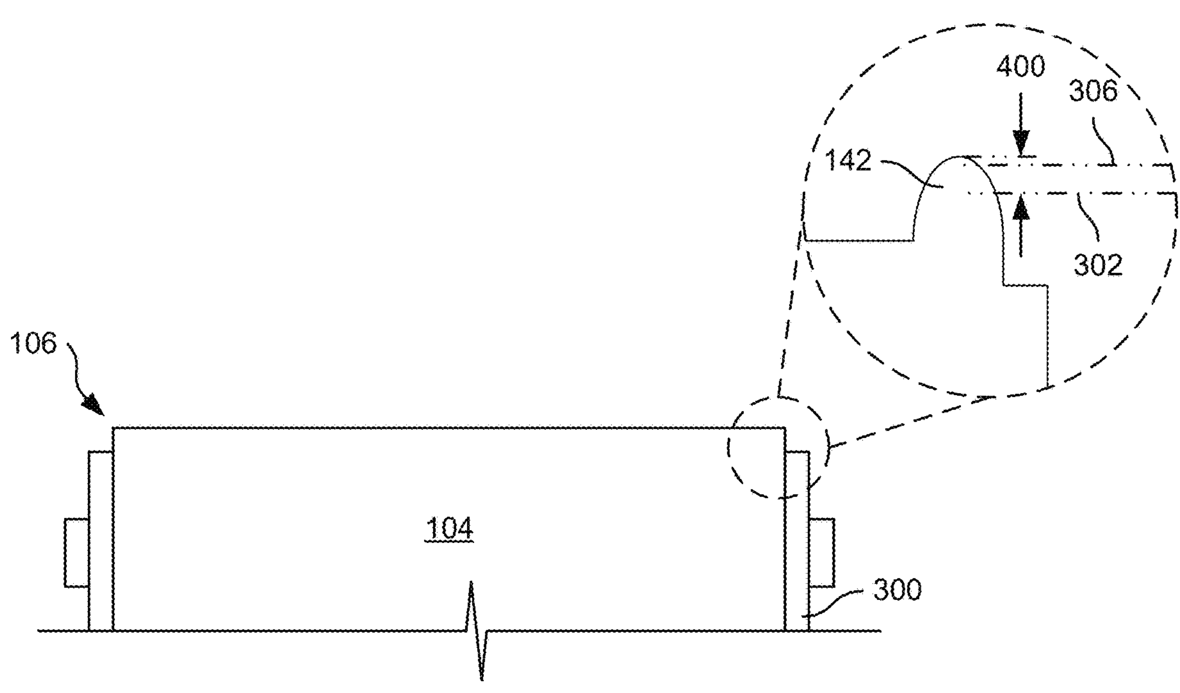
FIG. 4A
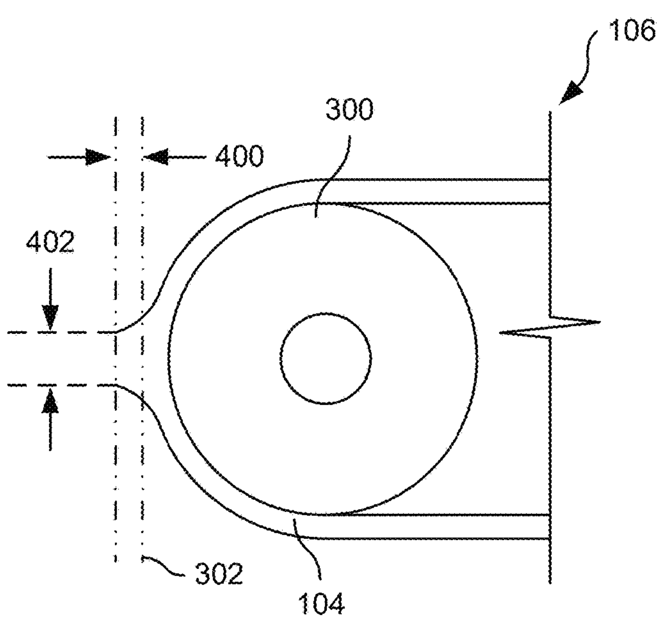
FIG. 4B
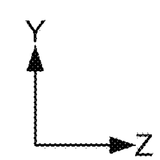

DETECTION SYSTEM FOR DETECTING CRACKS IN CONVEYOR BELT

BACKGROUND

Modern environments, such as warehouses, distribution centers, airports, and manufacturing facilities include conveyors that may be used to transport item(s) from one location to another. In some examples, the conveyors may include belt conveyors, whereby a belt is disposed about one or more pulleys and driven by one or more motors. Over time, the belt may become worn and in need of replacement. However, if not properly monitored for replacement, the belt may lead to decreased throughput, damage to the conveyor, and/or the item(s) being transported along the conveyor.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIGS. 2A and 2B illustrate an example sensor arranged adjacent to the conveyor belt for use in determining whether cracks are present in the conveyor belt, according to examples of the present disclosure.

FIGS. 4A and 4B illustrate an example displacement of the conveyor belt for detecting a crack in the conveyor belt using the detection system of FIG. 1, according to examples of the present disclosure.

DETAILED DESCRIPTION

Figure 1:
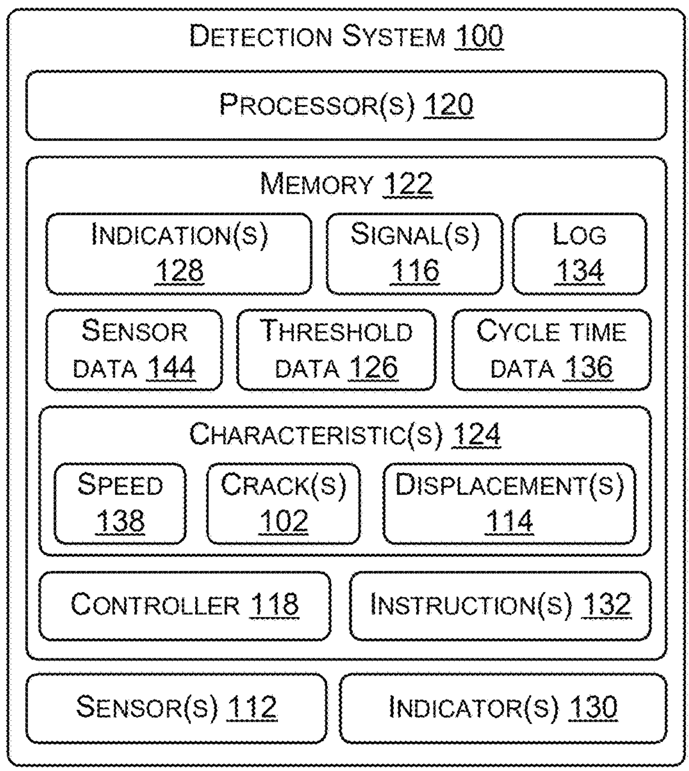
FIG. 1 illustrates an example environment including an example detection system used to determine whether crack(s) are present in a conveyor belt, according to examples of the present disclosure.
Figure 1:
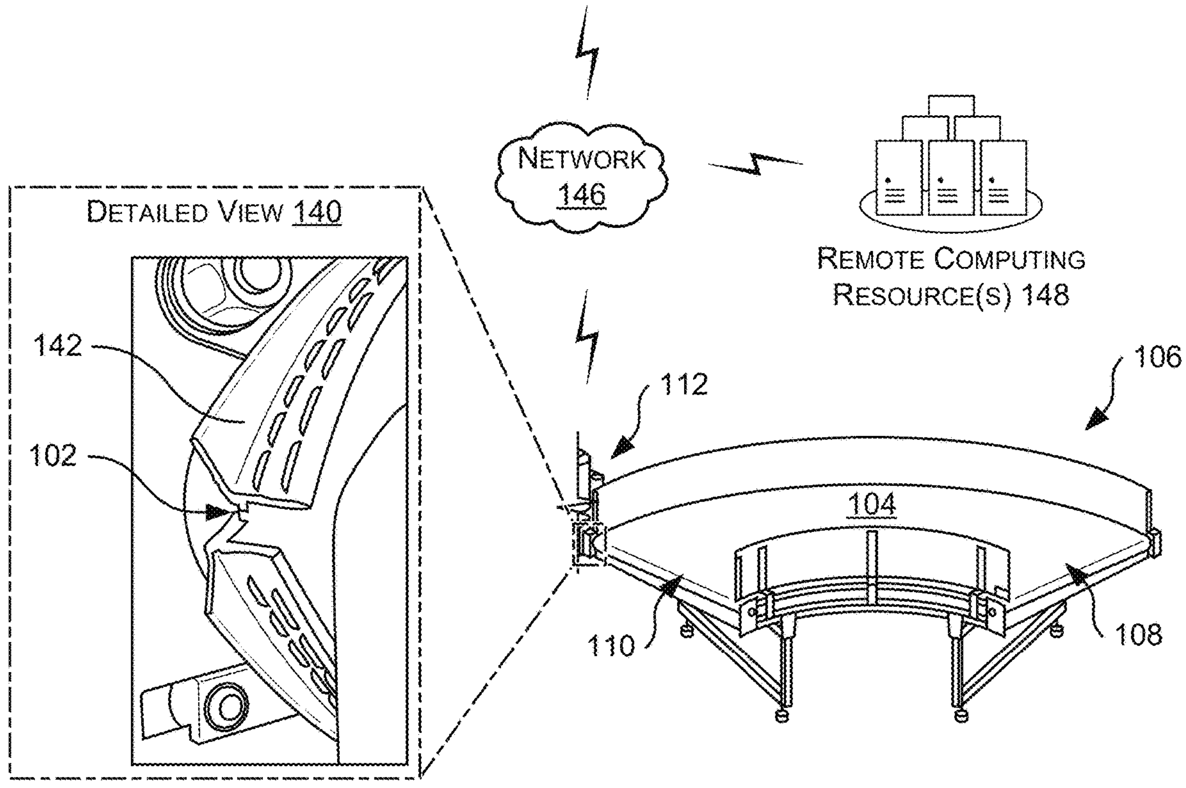

This application is directed, at least in part, to a detection system that monitors a conveyor belt of a conveyor system to determine whether the conveyor belt includes any crack(s) that necessitate replacement or repair of the conveyor belt, according to examples of the present disclosure. In some instances, the detection system may include, or be communicatively coupled to, a sensor arranged adjacent to the conveyor belt. The sensor may generate signals associated with the presence or absence of cracks in the conveyor belt. For example, as the conveyor belt is driven, different portions of the conveyor belt may come within a field of view (FoV) or detection area of the sensor. During the presence of a crack, a surface of the conveyor belt may become displaced from a standard (e.g., normal, typical, designed, etc.) position. This displacement may be sensed by the sensor and associated with a crack in the conveyor belt. In some instances, the amount of time the sensor detects the displacement may indicate a severity or dimension (e.g., length, width, etc.) of the crack. For example, based on the amount of time that the detection system receives the signal indicating the displacement, the detection system may determine the dimension(s) of the crack. When the dimension of the crack is greater than a threshold, the belt may be scheduled for repair or maintenance. Accordingly, the detection system may be used to detect cracks within the conveyor belt to proactively service the conveyor belt before failure, thereby potentially leading to less down time, increased throughput, and/or decreased damage to item(s) conveyed along the conveyor system.

In some instances, the sensor may include any suitable sensor, such as a photoelectric sensor (e.g., thru-beam, retroreflective, or diffused), ultrasonic sensor, laser sensor, camera, etc. In some instances, the sensor is arranged proximate to an end of the conveyor belt, such as where the conveyor belt rounds a pulley of the conveyor system. For example, the sensor may be arranged proximate to a head pulley of the conveyor system and/or a tail pulley of the conveyor system. The sensor may be arranged to detect displacements of the conveyor belt as the conveyor belt rounds over the pulley to change direction. If cracks are present in the conveyor belt, as the conveyor belt rounds over the pulley, from a top of the pulley to a bottom of the pulley, for example, the cracks may tend to open, flex, or stretch. As the cracks open when the conveyor belt rounds over the pulley, the sensor may be arranged to sense a displacement of the crack.

In some instances, the sensor may be arranged vertically above the head pulley of the conveyor system and/or the tail pulley of the conveyor system. Mounting the sensor overhead of the conveyor belt and/or the pulley may maximize, or increase, the detection area (e.g., zone, region, etc.) of the sensor for detecting cracks in the conveyor belt. For example, by mounting overhead, cracks that are present in the conveyor belt may travel a longer distance within the detection area as compared to if the sensor was mounted in front (e.g., head-on) of the conveyor belt.

In some instances, the sensors may be arranged to detect a minimum amount of displacement from a standard position, state, etc. of the conveyor belt. The standard position may be alternatively referred to as a normal position, typical position, usual position, non-displaced position, designed position, preconfigured position, etc. At the standard position, no cracks may be present in the conveyor belt. The sensors may be installed on the conveyor system, or components thereof (e.g., frame, struts, etc.), to be able to detect a one-millimeter displacement in the conveyor belt from the standard position. For example, if the conveyor belt is displaced one millimeter beyond the standard position, the sensor may be arranged to detect such displacement. However, the sensors may detect displacements beyond one millimeter or less than one millimeter. In some instances, the sensor may be disposed within a housing and mounted to the conveyor system. The housing may orient the sensor relative to the conveyor belt and/or the pulley, such that the sensor is arranged to detect the displacements in the conveyor belt.

In some instances, the sensor may be arranged to detect cracks within any portion of the conveyor belt. In some instances, the conveyor belt may include ribs, protrusions, spines, etc. disposed along lateral sides of the conveyor. These ribs, in some instances, may be sewn onto the conveyor belt. In some instances, the cracks may form within the ribs and the sensor may be arranged vertically above the ribs to detect the cracks in the ribs. As introduced above, as the conveyor belt rounds over the pulley, any cracks within the ribs may tend to open, thereby extending beyond the standard position, and the sensor may generate signals indicative of the displacement.

The signals generated by the sensor may be received by a controller of the detection system. In some instances, the sensor may generate the signals (e.g., voltage) based on detecting a displacement of the conveyor belt from the standard position. In some instances, the controller may receive signals when displacements are greater than the minimum amount of displacement that triggers the sensor to generate the signals. For example, the sensor may include a photoelectric sensor that outputs a light curtain one millimeter from the standard position of the conveyor belt. As cracks form within the conveyor belt, portions of the conveyor belt may extend beyond the light curtain, thereby impeding the light curtain and/or interfering with the photoelectric sensor receiving the light. The sensor may detect such disturbance and generate a signal indicative of such. Upon receipt, the controller may associate the signal (or an increase in the voltage within the signal) with a crack in the conveyor belt. As such, based at least in part upon a receipt of the signals, the controller may determine when cracks are present in the conveyor belt. In some instances, the controller may receive a raw signal or a processed signal (e.g., debounced signal) from the sensor. In some instances, the signals may be processed (e.g., debounced) to enable to controller to sense the signal.

Additionally, or alternatively, in some instances, the controller may determine a dimension of the crack based at least in part on the amount of time that the sensor detected the displacement, or the amount of time that the sensor transmitted the signal associated with the displacement. For example, when the displacement from the standard position is detected (e.g., greater than a one-millimeter displacement), the sensor may transmit the signal. Cracks in the conveyor belt with a larger dimension may be sensed by the sensor for a greater amount of time (e.g., 6.30 milliseconds) than cracks with a smaller dimension, which may be sensed for a smaller amount of time (e.g., 1.68 milliseconds). Here, the controller may determine the amount of time that the sensor detected the displacement of the conveyor belt away from the standard position. In some instances, the controller may determine the amount of time that the sensor transmitted the signal associated with the displacement of the conveyor belt. In some instances, the amount of time in which the controller received the signal may be utilized to characterize the crack. For example, based at least in part on the amount of time the signal was received, the detection system may determine the dimension of the crack. In some instances, the amount of time that the sensor detected the displacement may be used to determine a length of the crack.

The dimension of the crack may be compared to a threshold dimension to determine whether the conveyor belt needs replacement or repair. For example, if the dimension of the crack is greater than the threshold dimension, the conveyor belt may be scheduled for replacement. Alternatively, if the dimension of the crack is less than the threshold dimension, the conveyor belt may still be operable but in need of repair. In instances in which the conveyor belt needs replacement, the detection system (or another system) may output one or more indications at the conveyor system (e.g., audible, visual, etc.), generate one or more tasks associated with replacing the conveyor belt, repairing the conveyor belt, and so forth. In some instances, a width and/or the length of the crack may be used to determine whether the conveyor belt needs replacement.

In some instances, the controller of the detection system may compare the dimension to one or more thresholds to classify the crack. For example, the controller may compare the dimension to a first threshold dimension, a second threshold dimension, a third threshold dimension, and so forth. The first threshold dimension may be associated with a first dimension (e.g., 1 cm), the second threshold dimension may be associated with a second dimension (e.g., 2 cm), the third threshold dimension may be associated with a third dimension (e.g., 3 cm), etc. In some instances, the threshold dimensions may be used to trigger different tasks. For example, cracks that include a dimension greater than the third threshold dimension may be flagged for immediate repair, while cracks with a dimension greater than the first threshold dimension, but less than the second threshold dimension, may not be flagged for immediate repair, but may be flagged for maintenance, service, inspection, etc. Alternative tasks may include lessening a speed of the conveyor belt, scheduling the conveyor system for repair, etc.

The dimension of the crack may also be used to determine, at future instance in time, when the conveyor belt may need to be replaced. For example, although a crack at a particular instance in time may not include a dimension greater than the threshold dimension, the controller may determine a future instance in time when the crack will be greater than the threshold dimension and/or when the conveyor belt will require replacement. In some instances, the dimension of the crack (e.g., length of crack), a speed of the conveyor belt, a tension in the conveyor belt, a cycle time of the controller, etc. may be used to predict a future instance in time when the conveyor belt will need to be replaced or serviced. Machine-learning model(s), for example, may be trained to determine the future instance in time at which the crack will fail by comparing the characteristic(s) of the crack with a database of cracks (or characteristic(s) associated therewith).

In some instances, the detection system may determine that the conveyor belt needs to be repaired or replaced based at least in part on detecting that the conveyor belt includes a threshold number of cracks. For example, if the conveyor belt includes a threshold number of cracks, but the individual cracks themselves do not satisfy the threshold dimensions, the detection system may determine that the conveyor belt needs to be replaced or repaired. In this instance, because the conveyor belt may include a plurality of the cracks, while the individual cracks alone may not include a dimension greater than the threshold dimension, the cumulative effect of the cracks may necessitate repair or replacement of the conveyor belt.

In some instances, the sensor selected to monitor the conveyor belt may be based at least in part on specifics of the controller. For example, the controller may have a cycle time in which the controller is capable of detecting signals from the sensor. If the cycle time of the controller (e.g., 10 milliseconds) is greater than the amount of time that the sensor transmits the signal (e.g., less than 10 milliseconds), the controller may be unable to detect the signals. For example, if a crack were present in the conveyor belt, and the sensor transmitted the signal for an amount of time that was less than the cycle time of the controller, the controller would not detect the crack. Alternatively, if the sensor transmitted the signal for an amount of time that was greater than the cycle time, the controller would receive the signal and detect the crack.

Additionally, or alternatively, in some instances, the sensor may be selected based at least in part on characteristics of the conveyor system. For example, given that the conveyor belt may move at a certain speed (e.g., meters/second), the faster the conveyor belt is moving may equate to a lesser amount of time the sensor generates the signal indicative of the cracks. In turn, because the sensor may generate a signal for a less amount of time, as compared to a conveyor belt moving at a slower speed, the controller may have less amount of time to detect the signals from the sensor. In some instances, the minimum displacement that sensor is arranged to detect may be based on the cycle time of the controller and/or the belt speed of the conveyor system.

In some instances, the sensors may generate sensor data that indicates a displacement of the conveyor belt. The sensor data may indicate the displacement of the conveyor belt away from the standard position, or more generally, a position of the conveyor belt. The controller may analyze the sensor data to determine whether the displacement or the position of the conveyor belt is associated with a crack.

Although a particular method, sensor, etc. is described as determining the dimension of the crack to determine whether the conveyor belt needs to be replaced or serviced, other techniques are envisioned. For example, camera(s) may be arranged to monitor the conveyor belt and the detection system may analyze image data from the camera(s), using computer vision-based solutions and/or computer vision algorithms, to determine whether the conveyor belt needs to be replaced or serviced. Still, other sensor(s), such as vibration sensor(s), thermal sensor(s), etc. may generate sensor data that is used by the detection system to determine whether the conveyor belt needs to be replaced or serviced.

The detection system may find use in any environment in which item(s) are processed. For example, the detection system may be used within material handling facilities, airports, food processing, etc. to detect cracks in conveyor belts. In some instances, the detection system may be used to detect cracks in any type of conveyor system, such as straight conveyor systems, curved (e.g., wedge) conveyor systems, inclined conveyor systems, etc. Moreover, the conveyor belt may include any suitable conveyor belt, such as cleated conveyor belts, roller bed conveyor belts, flat conveyor belts, etc. The conveyor belts themselves may be manufactured from any number of layers made of rubber, fabric, piles, etc. Additionally, although the detection system is described as monitoring a conveyor belt of a conveyor system, the detection system may be arranged to monitor other belts of other systems, such as a timing belt of an engine, drive belts, etc.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example detection system 100 for determining one or more crack(s) 102 within a conveyor belt 104 of a conveyor system 106, according to examples of the present disclosure. In some instances, the conveyor system 106 may be disposed in an environment in which item(s) (e.g., electronics, food, goods, etc.) are processed, such as material handling facilities, airports, food processing, etc. As shown, the conveyor belt 104 may represent a curved conveyor belt (alternatively referred to herein as a wedge belt), however, other conveyor belts are envisioned. For example, the conveyor belt 104 may include any suitable conveyor belt, such as cleated conveyor belts, roller bed conveyor belts, flat conveyor belts, etc. The conveyor belt 104 may be configured to transport the item(s) from an input side 108 of the conveyor belt 104 to an output side 110 of the conveyor belt 104. In some instances, the conveyor belt 104 may transfer the item(s) between other conveyor belts, chutes, slides, or material handling equipment (MHE).

The detection system 100 may include, or be communicatively coupled to, a sensor 112 that is arranged to detect the crack(s) 102 in the conveyor belt 104. Although the sensor 112 is shown being a component of the detection system 100, the sensor 112 may be separate from the detection system 100, such as a component of another device that communicatively couples to the detection system 100. As will be explained herein, the sensor 112 may be mounted on an outside edge, corner, etc. of the conveyor belt 104, proximate to a location at which the conveyor belt 104 rounds a pulley. The sensor 112 may be arranged to detect displacements 114 of the conveyor belt 104 as the conveyor belt 104 rounds over the pulley to change direction.

The sensor 112 is configured to generate signal(s) 116 for analysis by the detection system 100 to determine whether the conveyor belt 104 includes the crack(s) 102. For example, the sensor 112 may be arranged to detect a displacement 114 of the conveyor belt 104 as the conveyor belt 104 rounds over the pulley. If crack(s) 102 are present in the conveyor belt 104, as the conveyor belt 104 rounds over the pulley, from a top of the pulley to a bottom of the pulley, for example, the crack(s) 102 may tend to open, flex, or stretch, thereby being displaced. As the crack(s) 102 open when the conveyor belt rounds over the pulley, the sensor 112 may be arranged to sense the displacement 114 of the conveyor belt 104.

In some instances, the sensor 112 may be arranged to detect a minimum amount of the displacement 114 from a standard position, state, etc. of the conveyor belt 104. For example, at the standard position, no crack(s) 102 may be present in the conveyor belt 104. In other words, when no crack(s) 102 are present, as the conveyor belt 104 rounds over the pulley, the sensor 112 may not detect the displacements 114 of the conveyor belt 104 from the standard position (or may detect displacements less than a threshold displacement). In such instances, the signal(s) 116 generated by the sensor 112 may not include a voltage indicative of the minimum displacement 114 in the conveyor belt 104. However, when the crack(s) 102 are present, as the crack(s) 102 roll over the pulley, the conveyor belt 104 may have a displacement 114 that is greater than the minimum displacement. Accordingly, the signal 116 generated by the sensor(s) 112 may indicate the displacement 114 of the conveyor belt 104. For example, the displacement 114 may be noted by a change in voltage (e.g., increase) within the signal 116.

In some instances, the sensor 112 may be installed on the conveyor system 106, or components thereof (e.g., frame, struts, etc.), to be able to detect a one-millimeter of displacement 114 in the conveyor belt 104 from the standard position. For example, if the conveyor belt 104 is displaced by or greater one-millimeter from the standard position, the sensor 112 may be arranged to detect such displacement 114 and generate the signal 116. However, in some instances, the sensor 112 may detect displacements 114 beyond one millimeter or less than one millimeter.

The signal(s) 116 generated by the sensor 112 may be received by a controller 118 of the detection system 100. In some instances, the controller 118 may include its own processor(s), or may utilize processor(s) 120 of the detection system 100. The controller 118 may also have access to its own memory, or memory 122 of the detection system 100. The controller 118 may be tasked with receiving the signal(s) 116 from the sensor 112, analyzing the signal(s) 116, and determining whether the crack(s) 102 are present or absent from in the conveyor belt 104 based at least in part on the signals 116. For example, as noted above, when the controller 118 receives a signal 116 that indicates a displacement 114 of the conveyor belt 104, the controller 118 may associate this displacement 114 with a crack 102 in the conveyor belt. As such, based at least in part upon a receipt of the signal(s) 116, or a voltage associated therewith, the controller 118 may determine when the cracks 102 are present in the conveyor belt 104. In some instances, the controller 118 may receive a raw signal or a processed signal (e.g., debounced signal) from the sensor 112. In some instances, the signal(s) 116 may be processed (e.g., debounced) to enable the controller 118 to sense the signal(s) 116. For example, the sensor 112 may add debounce to the signal 116 such that the controller 118 to sense the signal 116. In some instances, whether the sensor 112 adds debounce to the signal 116 may be based at least in part on the type of controller 118.

In some instances, the detection system 100 may determine characteristic(s) 124 of the crack(s) 102 based at least in part on the amount of time that the sensor 112 detected the displacement 114, or the amount of time that the sensor 112 transmitted the signal 116 associated with the displacement 114 to the controller 118. For example, when the displacement 114 from the standard position is detected (e.g., greater than a one-millimeter displacement), the sensor 112 may transmit the signal 116. The sensor 112 may transmit signals 116 for cracks 102 that are larger for a greater amount of time as comparted to cracks 102 that are smaller, whereby the signal(s) 116 may be transmitted for a lesser amount of time. That is, because cracks 102 that are larger may be detected for a longer amount of time, as the crack 102 rolls over the pulley, the signal 116 for a larger crack may be received for a greater amount of time as compared to a smaller crack. As an example, a larger crack may be sensed by the sensor 112 for a greater amount of time (e.g., 6.30 milliseconds), than a smaller crack, which may be sensed for a smaller amount of time (e.g., 1.68 milliseconds). Here, because the signal 116 associated with the larger crack may be received by the controller 118 for longer period of time, the controller 118 may characterize the crack 102.

In some instances, the controller 118 may determine the amount of time that the sensor 112 detected the displacement 114 of the conveyor belt 104 away from the standard position. For example, the controller 118 may receive a signal 116 from the sensor 112 when the conveyor belt 104 is displaced beyond the standard position. In some instances, the controller 118 may determine the amount of time that the sensor 112 transmitted the signal 116 associated with the displacement 114 of the conveyor belt 104 to determine characteristic(s) 124 of the crack 102. In some instances, the controller 118 may determine, across multiple signals 116, an amount of time that the conveyor belt 104 was displaced.

In some instances, the characteristic(s) 124 may include dimensions of the crack 102, such as a length, width, depth, etc. The characteristic(s) 124 may also include an identification of the crack 102, such as a location of the crack 102 along a length of the conveyor belt 104, a classification of the crack 102 (e.g., low concern, medium concern, high concern, etc.), a type of crack 102 (e.g., chip, tear, etc.), and so forth. The characteristic(s) 124 may also include the detected displacement 114 of the conveyor belt 104, which as noted above, may be used to determine the dimensions of the crack 102 (e.g., based on how long the signal 116 was received). The characteristic(s) 124 may also be associated with the conveyor belt 104 and/or the conveyor system 106, such as a speed 138 at which the conveyor belt 104 moves, a tension in the conveyor belt 104, and so forth.

In some instances, the controller 118 or the detection system 100 (e.g., using the processor(s) 120 and/or the memory 122) may compare the characteristic(s) 124 to one or more thresholds, which may be stored as threshold data 126 in the memory 122. In some instances, the thresholds may be associated with characterizing the crack 102 and/or used to determine whether the crack 102 necessitates replacement or repair of the conveyor belt 104. For example, the dimension of the crack 102 may be compared to a threshold dimension to determine whether the conveyor belt 104 needs replacement or repair. If the dimension of the crack 102 is greater than the threshold dimension, the conveyor belt 104 may be scheduled for replacement or repair. Alternatively, if the dimension of the crack 102 is less than the threshold dimension, the conveyor belt 104 may still be operable and not in need of replacement or repair. That is, even though the conveyor belt 104 may include a crack 102, the crack 102 may not be severe enough to necessitate replacement or repair of the conveyor belt 104.

In some instances, the dimension of the crack 102 may be compared to multiple thresholds. For example, the dimension may be compared to a first threshold dimension, a second threshold dimension, a third threshold dimension, and so forth. The first threshold dimension may be associated with a first dimension (e.g., 1 cm), the second threshold dimension may be associated with a second dimension (e.g., 2 cm), the third threshold dimension may be associated with a third dimension (e.g., 3 cm), etc. In some instances, the threshold dimensions may be used to trigger different tasks. For example, cracks 102 that include a dimension greater than the third threshold dimension may be flagged for immediate repair, while cracks 102 with a dimension greater than the first threshold dimension, but less than the second threshold dimension, may not be flagged for immediate repair, but may be flagged for maintenance, service, inspection, etc.

The detection system 100 may generate one or more indication(s) 128 associated with the crack 102. For example, when the conveyor belt 104 needs replacement, the detection system 100 may generate an indication 128 for output via an indicator 130 (e.g., lighting element, loudspeaker, etc. at the conveyor system 106). The indication 128 may also be transmitted to other communicatively coupled systems, devices, etc. For example, an associate working within the environment may receive the indication 128 to repair or replace the conveyor belt 104. The different threshold dimensions may be used to trigger different indications 128, for example, based on the severity (e.g., classification) of the crack 102.

In some instances, the indications 128 may be associated with, or the detection system 100 may generate, instructions 132 associated with controlling the conveyor system 106. For example, when a crack 102 is detected that necessitates replacement of the conveyor belt 104, the controller 118 may transmit an instruction 132 to a motor of the conveyor belt 104 that causes the motor to turn off, reduce speed, etc. The instructions 132 may cause the motor, for example, to be controlled via the detection system 100 to reduce damage to the conveyor belt 104, the conveyor system 106, item(s) being transported along the conveyor belt 104, and so forth.

The memory 122 is shown storing or having access to a log 134. In some instances, the log 134 may indicate the cracks 102 detected in the conveyor belt 104, such as a history of the cracks 102, the characteristic(s) 124 of the crack 102, an identity or location of the conveyor belt 104 within an environment, and so forth. The detection system 100 may also receive, or be communicatively coupled to, a plurality of sensor(s) disposed across any number of conveyor systems within any number of environments. As such, the detection system 100 may process the signals 116 for any number of sensors across conveyor systems for determining the cracks 102 and whether the conveyor belts 104, respectively, need replacement or repair. In some instances, the log 134 may indicate the cracks 102 disposed across the conveyor belts 104 as a way to distinguish and identify the cracks 102 from one another.

In some instances, the sensor 112 may include any suitable sensor, such as a photoelectric sensor (thru-beam, retroreflective, or diffused), ultrasonic sensor, laser sensor, camera, etc. In some instances, the sensor 112 may be based at least in part on specifics of the controller 118 and/or the conveyor system 106. For example, the controller 118 may have a cycle time associated with an amount of time in which the controller 118 is capable of detecting the signal(s) 116 from the sensor 112. If the cycle time of the controller 118 is greater than the amount of time that the sensor 112 transmits the signal 116, the controller 118 may be unable to detect the signals 116. For example, if the cycle time of the controller 118 is 10 milliseconds, but the sensor 112 transmits the signal 116 for less than 10 milliseconds, the controller 118 would be unable to detect the signal 116. In these instances, possible cracks 102 in the conveyor belt 104 may go undetected. By way of comparison, if the sensor 112 transmits the signal 116 for an amount of time that is greater than the cycle time, the controller 118 would receive the signal and detect the crack 102.

The sensor 112 may be selected based at least in part on characteristics of the conveyor system 106. For example, given that the conveyor belt 104 may move at a certain speed (e.g., meters/second), the faster the conveyor belt 104 is moving may equate to a lesser amount of time the sensor 112 generates the signal 116 indicative of the crack 102. That is, the displacement 114 may be sensed for a lesser period of time if the conveyor belt 104 is moving at a faster speed. In turn, because the sensor 112 may generate the signal 116 for a less amount of time, as compared to a conveyor belt 104 moving at a slower speed, the controller 118 may have a less amount of time to detect the signals 116 from the sensor 112. In some instances, the cycle time of the controller 118 may be stored as cycle time data 136 in the memory 122, where the cycle time data 136 may be used to select an appropriate sensor 112 and/or controller 118, or set a cycle time associated with the controller 118. For example, the detection system 100 may be installed retroactively on the conveyor system 106, and use preexisting controllers. For the sensor(s) 112 to work with the controller 118, a sensor may be appropriately selected. Moreover, in some instances, the minimum displacement that sensor 112 is arranged to detect may be based on the cycle time of the controller 118 and/or the speed 138 of the conveyor system 106.

In some instances, the characteristic(s) 124 may be used to determine, at future instance in time, when the conveyor belt 104 may need to be replaced. For example, although a crack 102 at a particular instance in time may not include a dimension greater than the threshold dimension, the controller 118 may determine a future instance in time when the crack 102 will be greater than the threshold dimension and/or when the conveyor belt 104 will require replacement. In some instances, the dimension of the crack (e.g., length of the crack), the speed 138 of the conveyor belt 104, a tension in the conveyor belt 104, a cycle time of the controller 118, etc. may be used to predict a future instance in time when the conveyor belt 104 will need to be replaced or serviced. Machine-learning model(s), for example, may be trained to determine the future instance in time at which the crack 102 will fail by comparing the characteristic(s) 124 of the crack 102 with a database of characteristic(s) associated with previous cracks.

An example crack 102 in the conveyor belt 104 is shown in a detailed view 140. The sensor 112, which is not shown in the detailed view 140, may include a photoelectric sensor that outputs a light curtain at one millimeter from the standard position of the conveyor belt 104. As the crack 102 rounds over the pulley, the portions of the conveyor belt 104 corresponding to the crack 102 may be displaced beyond the standard position and impede the light curtain. Impeding of the light curtain may be sensed by the sensor 112 and the sensor 112 may generate the signal 116. Upon receipt of the signal 116, the controller 118 may associate the signal 116 with a crack 102 in the conveyor belt 104. As noted above, the controller 118 may determine an amount of time associated with the signal 116 being received to determine the characteristic(s) 124 of the crack 102 and whether the crack 102 necessitates replacement or repair of the conveyor belt 104.

In some instances, the sensor 112 may be arranged to detect the cracks 102 within any portion of the conveyor belt 104. In some instances, the conveyor belt 104 may include ribs 142 (e.g., protrusions, spines, etc.) disposed along lateral sides of the conveyor belt 104. These ribs 142, in some instances, may be sewn onto the conveyor belt 104. In some instances, the cracks 102 may form within the ribs 142 and the sensor 112 may be arranged vertically above the ribs 142 to detect the cracks 102 in the ribs 142. As the conveyor belt 104 rounds over the pulley, any cracks 102 within the ribs 142 may tend to open, thereby displacing beyond the standard position and subsequently being detected by the sensor 112.

The sensor(s) 112 may also include additional sensors, such as a cameras, for example, which generate sensor data 144 associated with the conveyor system 106. In such instances, the sensor data 144 may indicate a location, position, displacement, etc. of the conveyor belt 104 for determining whether the crack(s) 102 are present. The detection system 100, or the controller 118, may use computer vision-based solutions and/or computer vision algorithms, to analyze the sensor data 144 and determine whether the conveyor belt 104 needs to be replaced or serviced. Still, other sensor(s), such as vibration sensor(s), thermal sensor(s), etc. may generate sensor data 144 that is used by the detection system 100 to determine whether the conveyor belt 104 needs to be replaced or serviced.

The sensor 112, or a device having the sensor 112, may communicatively couple to the detection system 100 via one or more network(s) 146. The network(s) 146 may be representative of any suitable wired or wireless network. In some instances, the sensor 112 and/or the detection system 100 may be communicatively coupled to one or more remote computing resource(s) 148, which may additionally or alternatively be used for determining the crack(s) 102. Any level of split processing may be carried out by the detection system 100 and the remote computing resource(s) 148. The detection system 100, the remote computing resource(s) 148, and/or other devices may include network interface(s) (e.g., Bluetooth, Wi-Fi, etc.) for communicating over the one or more network(s) 146.

In some instances, the detection system 100 and/or the remote computing resource(s) 148 may be implemented as one or more servers and may, in some instances, form a portion of a network-accessible computing platform implemented as a computing infrastructure of processors, storage, software, data access, etc. that is maintained and accessible via a network such as the Internet. The detection system 100 and/or the remote computing resource(s) 148 does not require end-user knowledge of the physical location and configuration of the system that delivers the services. Common expressions associated with the detection system 100 and/or the remote computing resource(s) 148 may include "on-demand computing", "software as a service (SaaS)", "platform computing", "network-accessible platform", "cloud services", "data centers", etc. However, in some instances, the detection system 100 and/or the remote computing resource(s) 148 may be located within a same environment or different environment as the conveyor system 106.

As used herein, a processor, such as the processor(s) 120 may include multiple processors and/or a processor having multiple cores. Further, the processor(s) 120 may comprise one or more cores of different types. For example, the processor(s) 120 may include application processor units, graphic processing units, and so forth. In one implementation, the processor(s) 120 may comprise a microcontroller and/or a microprocessor. The processor(s) 120 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 120 may possess its own local memory, which also may store program components, program data, and/or one or more operating systems.

Memory, such as the memory 122 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 120. The memory 122 is an example of non-transitory computer-readable media. The memory 122 may store an operating system and one or more software applications, instructions, programs, and/or data to implement the methods described herein and the functions attributed to the various systems.

FIGS. 2A and 2B illustrate the sensor 112 installed, or disposed, on the conveyor system 106, according to examples of the present disclosure. As discussed above, the sensor 112 may be mounted proximate to a position on the conveyor system 106 where the conveyor belt 104 rounds over a pulley. In some instances, the sensor 112 may be arranged proximate to a head pulley of the conveyor system 106 and/or a tail pulley of the conveyor system 106. Regardless, as the conveyor belt 104 rounds over the pulley, any cracks 102 within the conveyor belt 104, or the rib 142, may have a tendency to flex, or open, from a standard position. In some instances, a concentration of the force acting on the conveyor belt 104 may be greatest as the conveyor belt 104 rounds over the pulley, thereby causing the cracks 102 to open and be visible.

In some instances, the sensor 112 may be arranged vertically above the pulley of the conveyor system 106 (e.g., in the Y-direction). Mounting the sensor 112 overhead of the conveyor belt 104 and/or the pulley may maximize, or increase, a detection area (e.g., zone, region, etc.) of the sensor 112 for detecting cracks 102 in the conveyor belt 104. For example, by mounting the sensor 112 overhead, any cracks 102 that are present in the conveyor belt 104 may travel a longer distance within the detection area as compared to if the sensor 112 was mounted in front (e.g., head on, in the Z-direction) of the conveyor belt 104.

The sensor 112 may be disposed in a housing 200 that is mounted to the conveyor system 106 (e.g., frames, brackets, etc.). The housing 200 may orient the sensor 112 relative to the conveyor belt 104 and/or the pulley, such that the sensor 112 is arranged to detect the displacements 114 in the conveyor belt 104 (e.g., in the Z-direction). In some instances, the position of the housing 200 on the conveyor system 106 may be adjustable to change the displacement 114 capable of being detected by the sensor 112. The sensor 112 is shown including a cable 202, for example, which may communicatively couple the sensor 112 to the detection system 100 (e.g., the controller 118). In some instances, the housing 200 may mount to one or more plates 206 that are at least partially disposed over the conveyor belt 104 and/or the pulley.

In some instances, the sensor 112 may include one or more lighting elements 204 that output the indication(s) 128. When a crack 102 is detected, the lighting elements 204 may output an indication 128 of a first color (e.g., red), and/or when a crack 102 is absent, the lighting elements 204 may output an indication 128 of a second color (e.g., green).

Figure 3A:
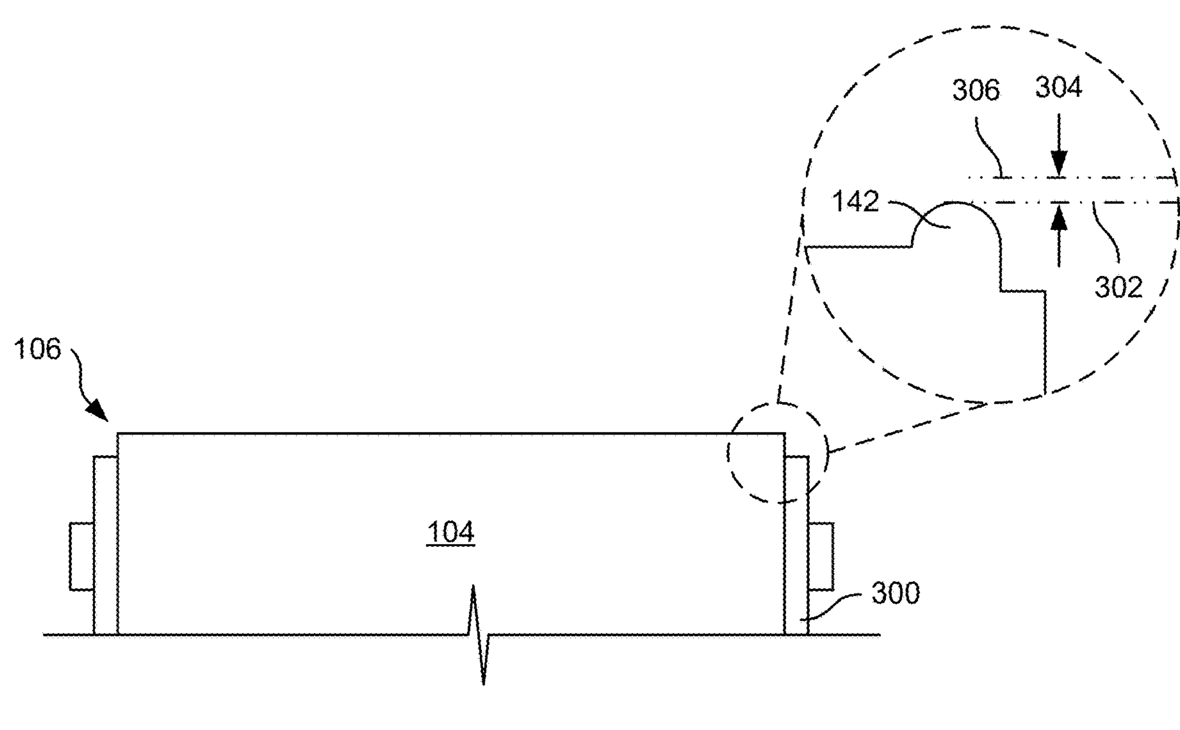
FIGS. 3A and 3B illustrate a position of a conveyor belt when crack(s) are absent, and a sensor arranged to detect a displacement of the conveyor belt, according to examples of the present disclosure.
Figure 3A:
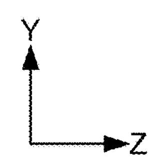
Figure 3B:
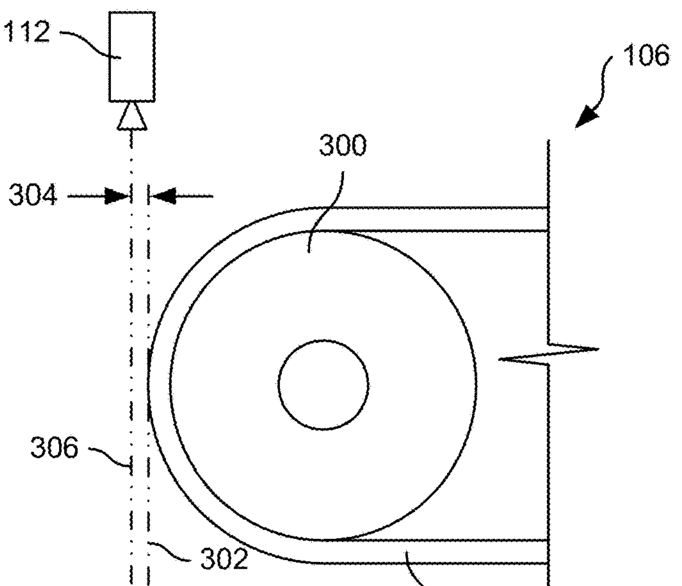
Figure 3B:

FIGS. 3A and 3B illustrate example characteristic(s) 124 of the conveyor belt 104 for detecting whether the conveyor belt 104 includes cracks 102, according to examples of the present disclosure. The views of the conveyor belt 104 in FIGS. 3A and 3B illustrate the conveyor belt 104 without cracks 102. During operation of the conveyor system 106, the conveyor belt 104 may round (e.g., roll) over a pulley 300 for changing directions (e.g., in the Z-direction). As the conveyor belt 104 rounds over the pulley 300, the conveyor belt 104 or the rib 142, may have a standard position 302 (e.g., first position). That is, when no cracks 102 are present in the conveyor belt 104, when the conveyor belt 104 rounds over the pulley 300, the rib 142 may be disposed at a standard position 302. In some instances, the standard position 302 may be associated with a displacement of the rib 142 from the pulley 300 (e.g., in the Z-direction). However, such displacement may not be associated with a crack. The standard position 302 may be associated with a plane disposed tangent to an exterior surface of the conveyor belt 104 (e.g., when the conveyor belt 104 rolls over the pulley 300 from top to bottom).

Comparatively, when cracks 102 are present in the conveyor belt 104, as the conveyor belt 104 rounds over the pulley 300, the conveyor belt 104 may be displaced from the standard position 302. More particularly, portions of the rib 142 that contain the cracks 102 may be disposed beyond the standard position 302 (e.g., in the Z-direction). In some instances, the sensor 112 may be arranged, or spaced apart from the standard position 302 to detect a minimum displacement 304. In some instances, the sensor 112 may be arranged to detect displacements that extend beyond a displacement position 306 (e.g., second position), where the displacement position 306 is spaced apart from standard position 302 by the minimum displacement 114. For example, the displacement position 306 may be disposed at one millimeter from the standard position 302, where the sensor 112 may detect one-millimeter displacements 114. When portions of the conveyor belt 104 extend beyond the minimum displacement 304, the sensor 112 may generate the signal 116. The controller 118 may therein receive the signals 116 when displacements of the conveyor belt 104 are greater than the minimum displacement 304 to characterize the portion of the conveyor belt 104 as a crack 102. However, the minimum displacement 304 may be less than or greater than one millimeter. Or, stated alternatively, the sensor 112 may be arranged at other displacement positions to detect other displacements 114 of the conveyor belt 104. The displacement position 306 may be associated with a plane arranged parallel to the plane associated with the standard position 302.

In some instances, the sensor 112 may represent a photoelectric sensor that outputs a beam of light at the displacement position 306. When cracks 102 are present in the conveyor belt 104, the cracks 102 may have a displacement 114 and impede, interrupt, lessen, etc, the light being received by the sensor 112. In such instances, the signal 116 generated by the sensor 112 may indicate such. The controller 118 may receive the signal 116 indicating the impedance as long as the crack 102 is displaced beyond the minimum displacement 304, or across the displacement position 306 The amount of time that the impedance is sensed may be indicative of the characteristic(s) 124 of the crack 102. In some instances, the light output by the sensor 112 may reflect off a mirror 308 and be received by a receiver of the sensor 112.

In some instances, the sensor 112 may have a detectable area 310 in which the sensor 112 is capable of, or configured to, detect the displacements 114 (e.g., beyond the displacement position 306). For example, by mounting the sensor 112 overhead (e.g., in the Y-direction), the sensor 112 may detect displacements 114 over a greater distance (e.g., as the conveyor belt 104 rolls over the pulley 300 from top to bottom) than if the sensor 112 was mounted in front of the conveyor belt 104 (e.g., in the Z-direction). As such, within the detectable area 310, the sensor 112 may determine whether any displacements 114 of the conveyor belt 104 are greater than the minimum displacement 304.

In some instances, the signal 116, or sensor data 144 generated by the sensor 112, may indicate a location within the detectable area 310 that the displacement 114 is sensed (e.g., in the Z-direction). Knowing how far the displacement 114 extends into the detectable area 310, past the displacement position 306, may be used to determine the characteristic(s) 124 of the crack 102, such a length (e.g., in the Y-direction) or width (e.g., in the Z-direction) of the crack 102.

FIGS. 4A and 4B illustrate a detection of a crack 102 in the conveyor belt 104, according to examples of the present disclosure. As introduced above, when cracks 102 are present in the conveyor belt 104, portions of the conveyor belt 104 may be displaced beyond the standard position 302 and/or the displacement position 306. For example, as shown in FIGS. 4A and 4B, a portion of the rib 142 that includes the crack 102 may be disposed beyond the displacement position 306. For example, the portion of the rib 142 may have a displacement 400, disposed between a tip of the rib 142 and the standard position 302. When cracks 102 are present, the light curtain, for example, of the sensor 112 may be impeded and the sensor 112 may generate a signal 116. The signal 116 may indicate, for example, that the portion of the rib 142 extends beyond the displacement position 306. Upon receipt, the controller 118 (or the detection system 100) may determine that a crack 102 is present in the conveyor belt 104, but may characterize the crack 102 based upon an amount of time that the displacement 400 extends past the displacement position 306. In some instances, the signal 116 may indicate the displacement 400 (e.g., distance), or the signal 116 may be used to determine whether any portions of the conveyor belt 104 extend beyond the displacement position 306.

In some instances, the displacement 400 may be associated with a width of the crack 102 (e.g., in the Z-direction). Based at least in part on how long the sensor 112 receives the signal 116, the crack 102 may include a length 402 (e.g., in the Y-direction). As the portion of the rib 142 rolls back over the pulley 300, the crack 102 may close up.

Figure 5:
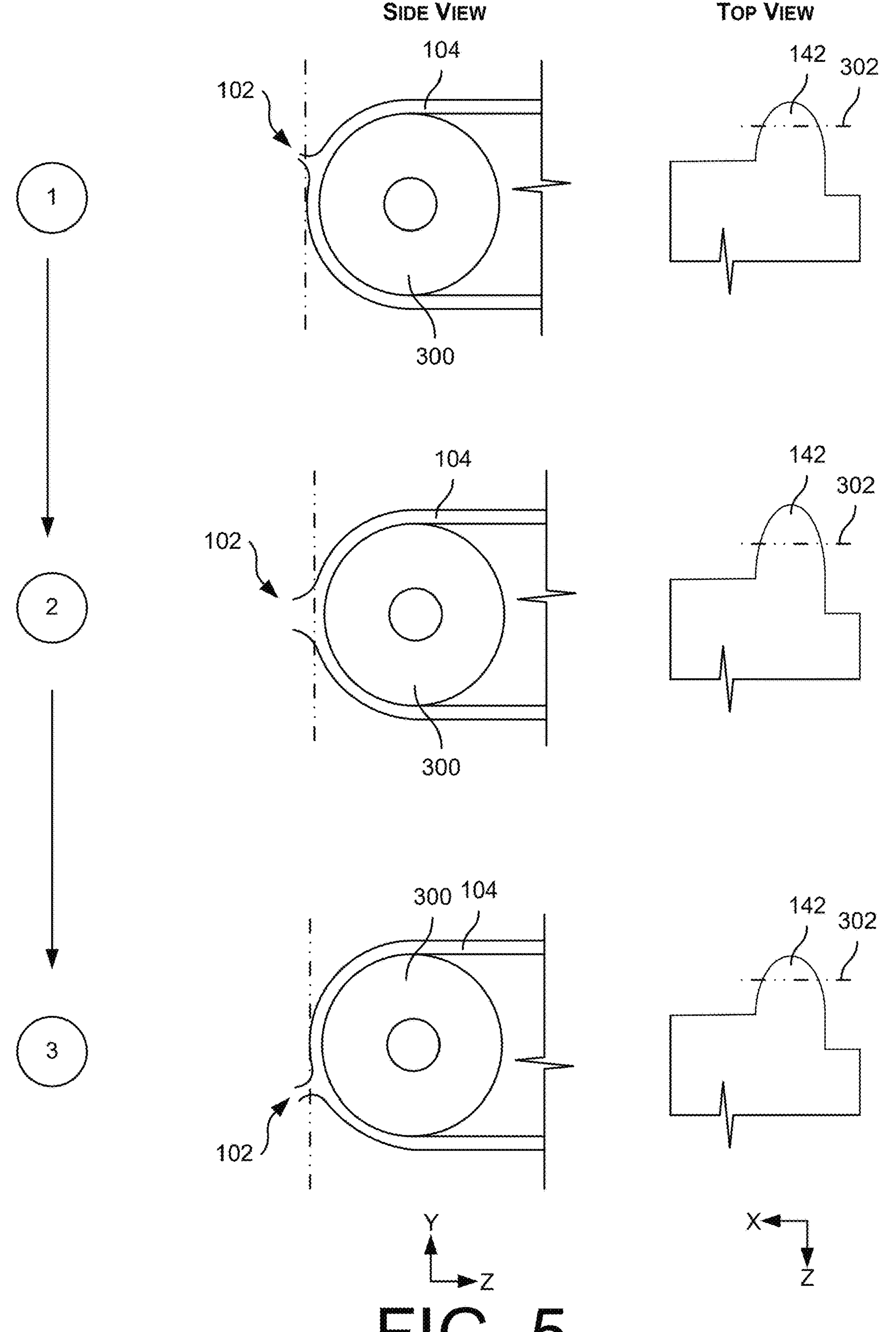
FIG. 5 illustrates an example sequence for detecting a displacement in the conveyor belt using the detection system of FIG. 1, according to examples of the present disclosure.

FIG. 5 illustrates an example sequence for detecting a crack 102 within a conveyor belt, according to examples of the present disclosure. At "1" in FIG. 5, as the conveyor belt 104 rolls over the pulley 300, portions of the conveyor belt 104 (e.g., the rib 142) may be displaced beyond the displacement position 306. At "1" in FIG. 5, the sensor 112 may generate a signal 116 associated with the conveyor belt 104 being beyond the displacement position 306. In some instances, the signal 116 at "1" may be generated at a first instance in time.

At "2" in FIG. 5, as the conveyor belt 104 continues to roll over the pulley 300, portions of the conveyor belt 104 (e.g., the rib 142) may be displaced beyond the displacement position 306. At "2" in FIG. 5, the sensor 112 may generate a signal 116 associated with the conveyor belt 104 being beyond the displacement position 306. In some instances, the signal 116 at "2" may be generated at a second instance in time that is after the first instance in time. In some instances, the signal 116 may indicate that the conveyor belt 104 extends beyond the displacement position 306 between the first instance in time and the second instance in time. Moreover, as shown at "2", the displacement of the conveyor belt 104 may be greater than the displacement of the conveyor belt 104 at "1" in FIG. 5. For example, at "2" in FIG. 5, the crack 102 may be acted upon by the pulley at its greatest force, thereby causing the crack 102 to open as the conveyor belt 104 rolls around the pulley 300.

At "3" in FIG. 5, as the conveyor belt 104 continues to roll over the pulley 300, portions of the conveyor belt 104 (e.g., the rib 142) may be displaced beyond the displacement position 306. At "3" in FIG. 5, the sensor 112 may generate a signal 116 associated with the conveyor belt 104 being beyond the displacement position 306. In some instances, the signal 116 at "3" may be generated at a third instance in time that is after the second instance in time. In some instances, the signal 116 may indicate that the conveyor belt 104 extends beyond the displacement position 306 between the second instance in time and the third instance in time.

The signal 116 may be used by the controller 118 to determine the characteristic(s) 124 of the crack 102. For example, the controller 118 may determine an amount of time associated with the conveyor belt 104 extending beyond the displacement position 306 between "1" and "3." In other words, the controller 118 may determine an amount of time that the signal 116 associated with the conveyor belt 104 extended beyond the displacement position 306 was received. This amount of time may indicate dimensions of the crack 102. In other words, for smaller or less severe cracks 102, for example, the crack 102 may not extend past the displacement position 306 at "1."

Although three instances in time are described, the controller 118 may receive the signals 116 indicating the displacement 114 of the conveyor belt 104 over any amount of time, which may be based at least in part on the cycle time of the controller 118. More generally, the controller 118 may determine an amount of time that the signal 116 associated with the conveyor belt 104 extending past the displacement position 306 was received for determining the characteristic(s) 124. In some instances, the longer the amount of the time may be equated to a more severe crack 102 in the conveyor belt 104.

Figure 6A:
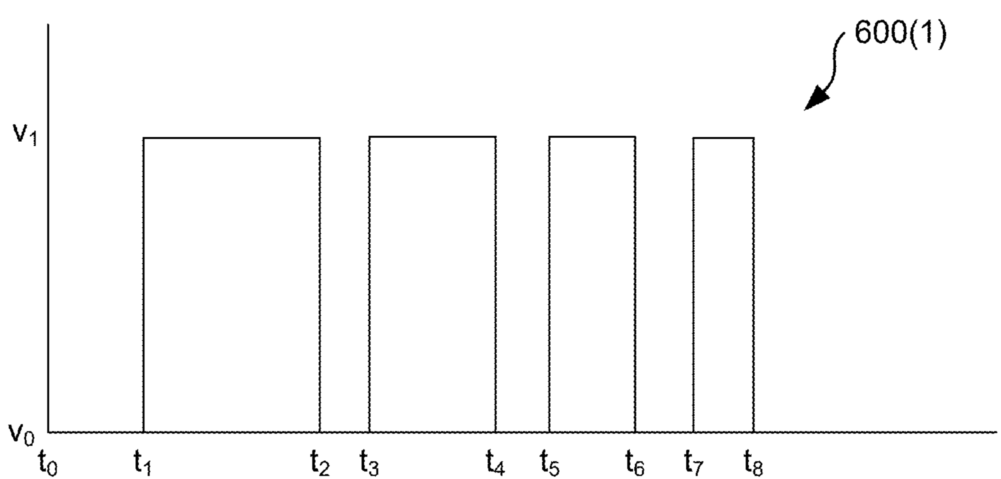
FIGS. 6A and 6B illustrate example signals of a sensor used in conjunction with the detection system of FIG. 1 to determine whether crack(s) are present in the conveyor belt, according to examples of the present disclosure.
Figure 6B:
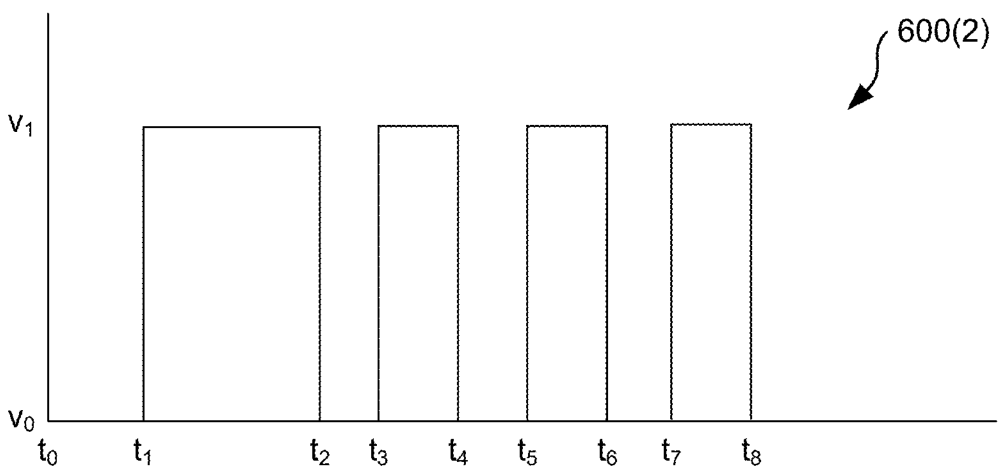

FIGS. 6A and 6B illustrate example signals 116 received by the controller 118, according to examples of the present disclosure.

In FIG. 6A, a first signal 600(1) is shown. Between time $t_1$ and time $t_2$, the conveyor belt 104 may be displaced beyond the displacement position 306 and accordingly, the first signal 600(1) may have a voltage $v_1$. In other words, the controller 118 may receive the first signal 600(1) when the conveyor belt 104 is displaced beyond the displacement position 306, for an amount of time between time $t_1$ and time $t_2$, at the voltage $v_1$. In some instances, the controller 118 may characterize the first signal 600(1) between time $t_1$ and time $t_2$ as a first size of crack (e.g., 4 cm in length). The controller 118 may receive the first signal 600(1) for an amount of time between time $t_3$ and time $t_4$, at the voltage $v_1$. The controller 118 may receive the first signal 600(1) when the conveyor belt 104 is displaced beyond the displacement position 306, for an amount of time between time $t_3$ and time $t_4$, at the voltage $v_1$. In some instances, the controller 118 may characterize the first signal 600(1) between time $t_3$ and time $t_4$ as a second size of crack (e.g., 3 cm in length) that is less than the first size of the crack (e.g., 4 cm in length). Similarly, the controller 118 may receive the first signal 600(1) when the conveyor belt 104 is displaced beyond the displacement position 306, for an amount of time between time $t_5$ and time $t_6$, at the voltage $v_1$, and characterize the first signal 600(1) between time $t_5$ and time $t_6$ as a third size of crack (e.g., 2 cm in length). Likewise, the controller 118 may receive the first signal 600(1) when the conveyor belt 104 is displaced beyond the displacement position 306, for an amount of time between time $t_7$ and time $t_8$, at the voltage $v_1$, and characterize the first signal 600(1) between time $t_7$ and time $t_8$ as a fourth size of crack (e.g., 1 cm in length).

The amount of time by which the controller 118 receives the signal 116, at voltage $v_1$, may therefore be used to characterize the crack. In other words, for larger (e.g., longer cracks) the conveyor belt 104 may be displaced beyond the displacement position 306 for a longer amount of time. That is, because the amount of time between time $t_3$ and time $t_4$ may be less than the amount of time between time $t_1$ and time $t_2$, the conveyor belt 104 may not have been displaced beyond the displacement position 306 between time $t_3$ and time $t_4$ for a long as an amount of time between time $t_1$ and time $t_2$.

In FIG. 6B, a second signal 600(2) is shown. Between time $t_1$ and time $t_2$, the conveyor belt 104 may be displaced beyond the displacement position 306 and accordingly, the second signal 600(2) may have a voltage $v_1$. Likewise, the controller 118 may receive the second signal 600(2) for an amount of time between time $t_3$ and time $t_4$, at the voltage $v_1$; for an amount of time between time $t_5$ and time $t_6$, at the voltage $v_1$; and for an amount of time between time $t_7$ and time $t_8$, at the voltage $v_1$.

The controller 118 may have a cycle time that permits the controller 118 to detect the first signal 600(1) and the second signal 600(2). However, depending upon the cycle time of the controller 118, the controller 118 may be unable to receive the signals 116 from the sensor 112. For example, in FIG. 6B, the controller 118 may be unable to distinguish between a size of cracks between time $t_3$ and time $t_4$, between time $t_5$ and $t_6$, and time $t_7$ and $t_8$. That is, even though the cracks 102 may be different in size, the controller 118 may have the inability to detect differences between the cracks 102 based on the cycle time.

Figure 7A:
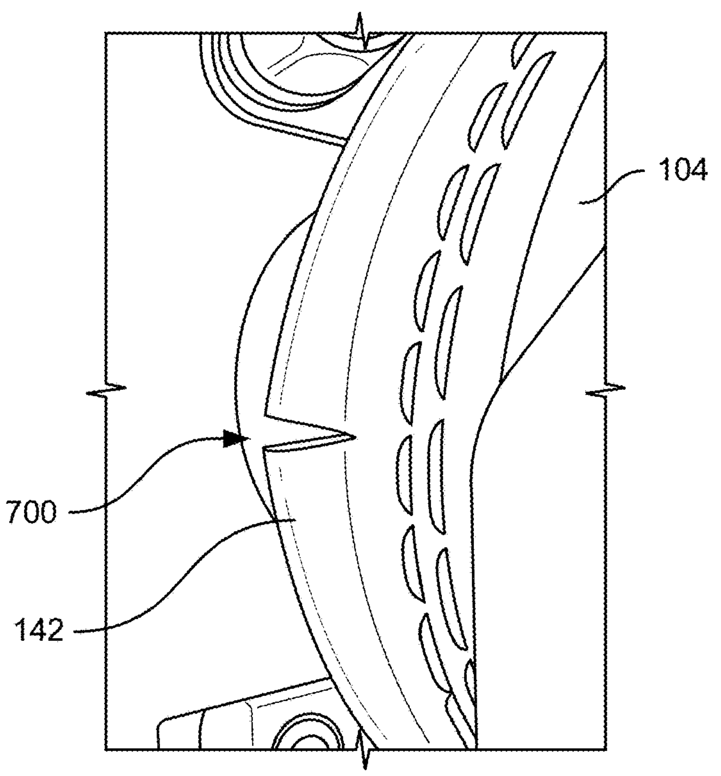
FIG. 7A illustrates an example image of a crack in the conveyor belt, according to examples of the present disclosure.
Figure 7A:
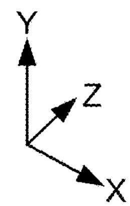
Figure 7B:
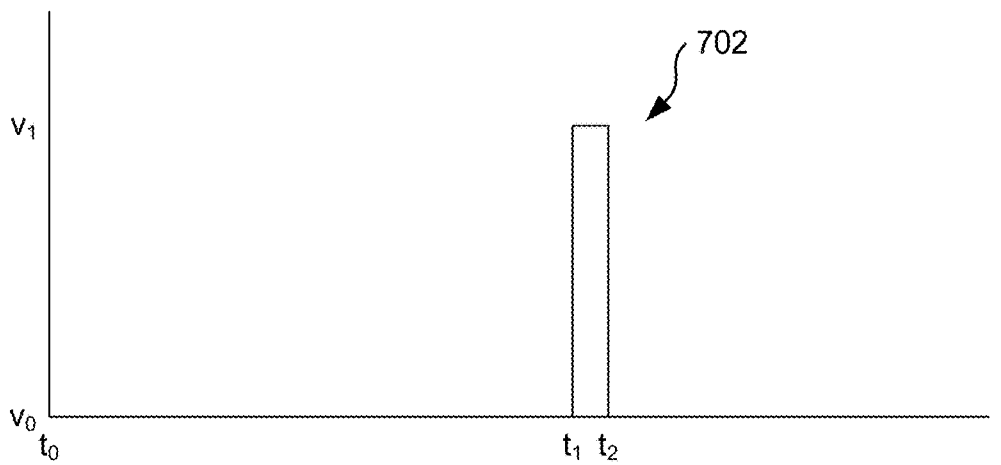
FIG. 7B illustrates an example signal associated with the crack of FIG. 7A, according to examples of the present disclosure.

FIG. 7A illustrates an example crack 700 formed within the conveyor belt 104, and FIG. 7B illustrates a signal 702 associated with the crack 700, according to examples of the present disclosure. As introduced above, when a portion of the rib 142 that includes the crack 700 rounds over the pulley 300, the portion of the rib 142 may flex outward, thereby exposing the crack 700. During this instance, if the crack 700 is displaced beyond the displacement position 306 (e.g., greater than the minimum displacement 304), the sensor 112 will generate the signal 702. For example, from time $t_1$ to time $t_2$, the sensor 112 generates the signal 702 with voltage $v_1$. The controller 118 may include a sufficient cycle time to be able to sense the signal 702 for determining the presence of the crack 700.

The controller 118, or the detection system 100, using the signal 702 may characterize the crack 700 based on one or more characteristic(s) 124. For example, depending upon an amount of time between time $t_1$ and time $t_2$, the controller 118 may determine characteristic(s) 124 of the crack 700, such as a width, length, severity, etc. Based on the characteristic(s) 124, the controller 118 may determine whether the conveyor belt 104 necessitates replacement or repair.

Figure 8A:
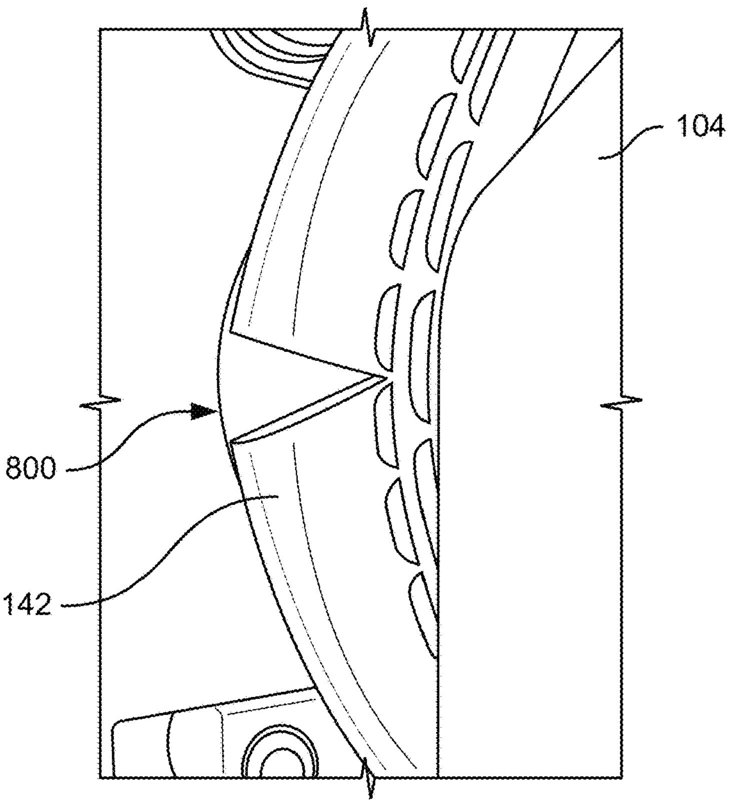
FIG. 8A illustrates an example image of a crack in the conveyor belt, according to examples of the present disclosure.
Figure 8A:
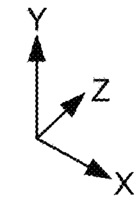
Figure 8B:
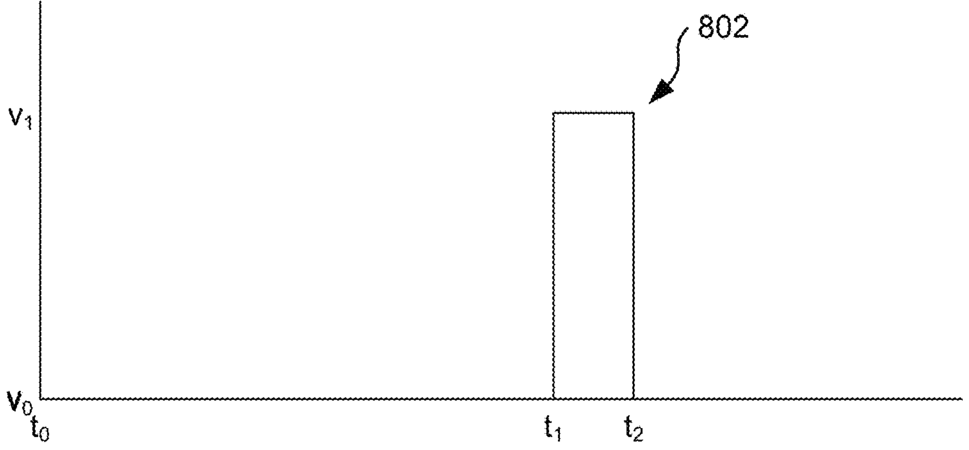
FIG. 8B illustrates an example signal associated with the crack of FIG. 8A, according to examples of the present disclosure.

FIG. 8A illustrates an example crack 800 formed within the conveyor belt 104, and FIG. 8B illustrates a signal 802 associated with the crack 800, according to examples of the present disclosure. As the crack 800 rounds over the pulley 300, the portion of the rib 142 may flex outward, thereby exposing the crack 800. During this instance, if the crack 800 is displaced beyond the displacement position 306 (e.g., greater than the minimum displacement 304), the sensor 112 will generate the signal 802. For example, from time $t_1$ to time $t_2$, the sensor 112 generates the signal 802 with voltage $v_1$. The controller 118 may include a sufficient cycle time to be able to sense the signal 802 for determining the presence of the crack 800.

The controller 118, or the detection system 100, using the signal 802 may characterize the crack 800 based on one or more characteristic(s) 124. For example, depending upon an amount of time between time $t_1$ and time $t_2$, the controller 118 may determine characteristic(s) 124 of the crack 800, such as a width, length, severity, etc. Based on the characteristic(s) 124, the controller 118 may determine whether the conveyor belt 104 necessitates replacement or repair. In comparison to the crack 700 discussed above with regard to FIGS. 7A and 7B, the crack 800 may include larger dimensions. In other words, the amount of time between time $t_1$ and time $t_2$ may be greater for the signal 802 and the amount of time between time $t_1$ and $t_2$ for the signal 702. Because the amount of time is greater, the crack 800 may be larger than the crack 700.

Figure 9A:
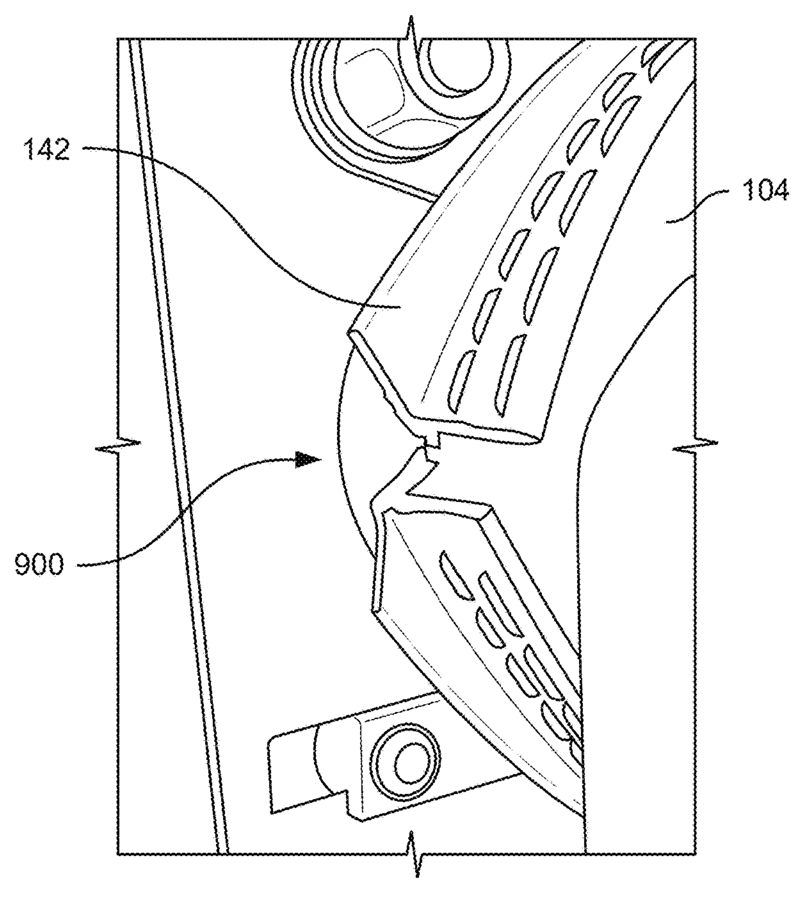
FIG. 9A illustrates an example image of a crack in the conveyor belt, according to examples of the present disclosure.
Figure 9B:
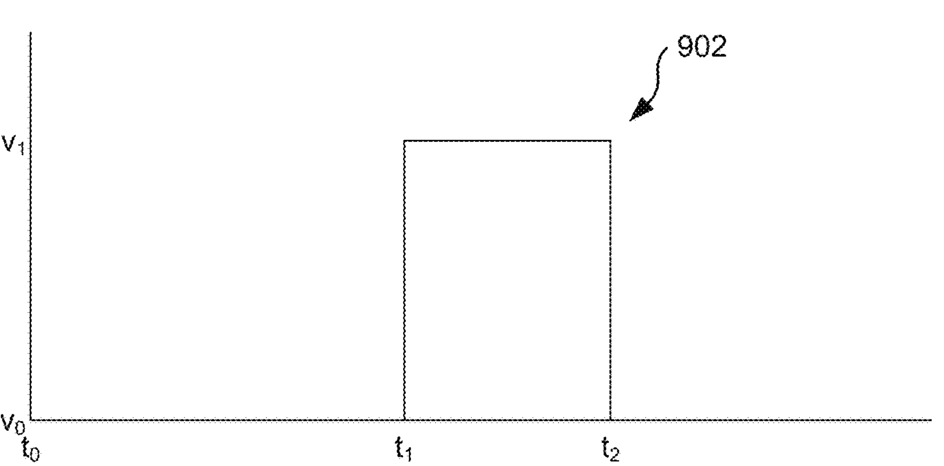
FIG. 9B illustrates an example signal associated with the crack of FIG. 8A, according to examples of the present disclosure.

FIG. 9A illustrates an example crack 900 formed within the conveyor belt 104, and FIG. 9B illustrates a signal 902 associated with the crack 900, according to examples of the present disclosure. As the crack 900 rounds over the pulley 300, the portion of the rib 142 may flex outward, thereby exposing the crack 900. During this instance, if the crack 900 is displaced beyond the displacement position 306 (e.g., greater than the minimum displacement 304), the sensor 112 will generate the signal 902. For example, from time $t_1$ to time $t_2$, the sensor 112 generates the signal 902 with voltage $v_1$. The controller 118 may include a sufficient cycle time to be able to sense the signal 902 for determining the presence of the crack 900.

The controller 118, or the detection system 100, using the signal 902 may characterize the crack 900 based on one or more characteristic(s) 124. For example, depending upon an amount of time between time $t_1$ and time $t_2$, the controller 118 may determine characteristic(s) 124 of the crack 900, such as a width, length, severity, etc. Based on the characteristic(s) 124, the controller 118 may determine whether the conveyor belt 104 necessitates replacement or repair. In comparison to the crack 800 discussed above with regard to FIGS. 8A and 8B, the crack 900 may include dimensions that are larger. In other words, the amount of time between time $t_1$ and time $t_2$ may be greater for the signal 902 and the amount of time between time $t_1$ and $t_2$ for the signal 802. Because the amount of time is greater, the crack 900 may be larger than the crack 800.

Figure 10:
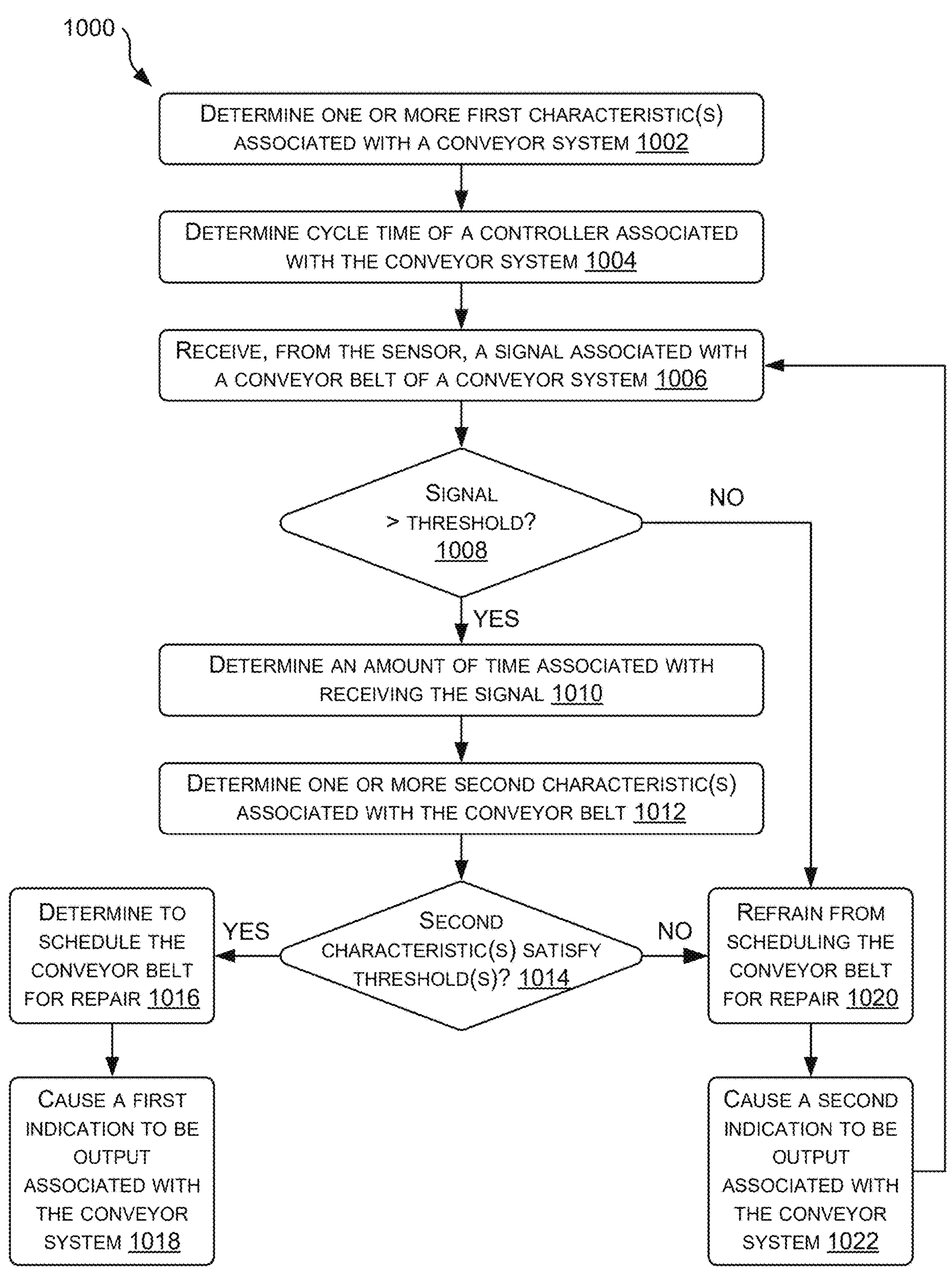
FIG. 10 illustrates an example process associated with determining characteristic(s) of a conveyor belt, according to examples of the present disclosure.
Figure 11:
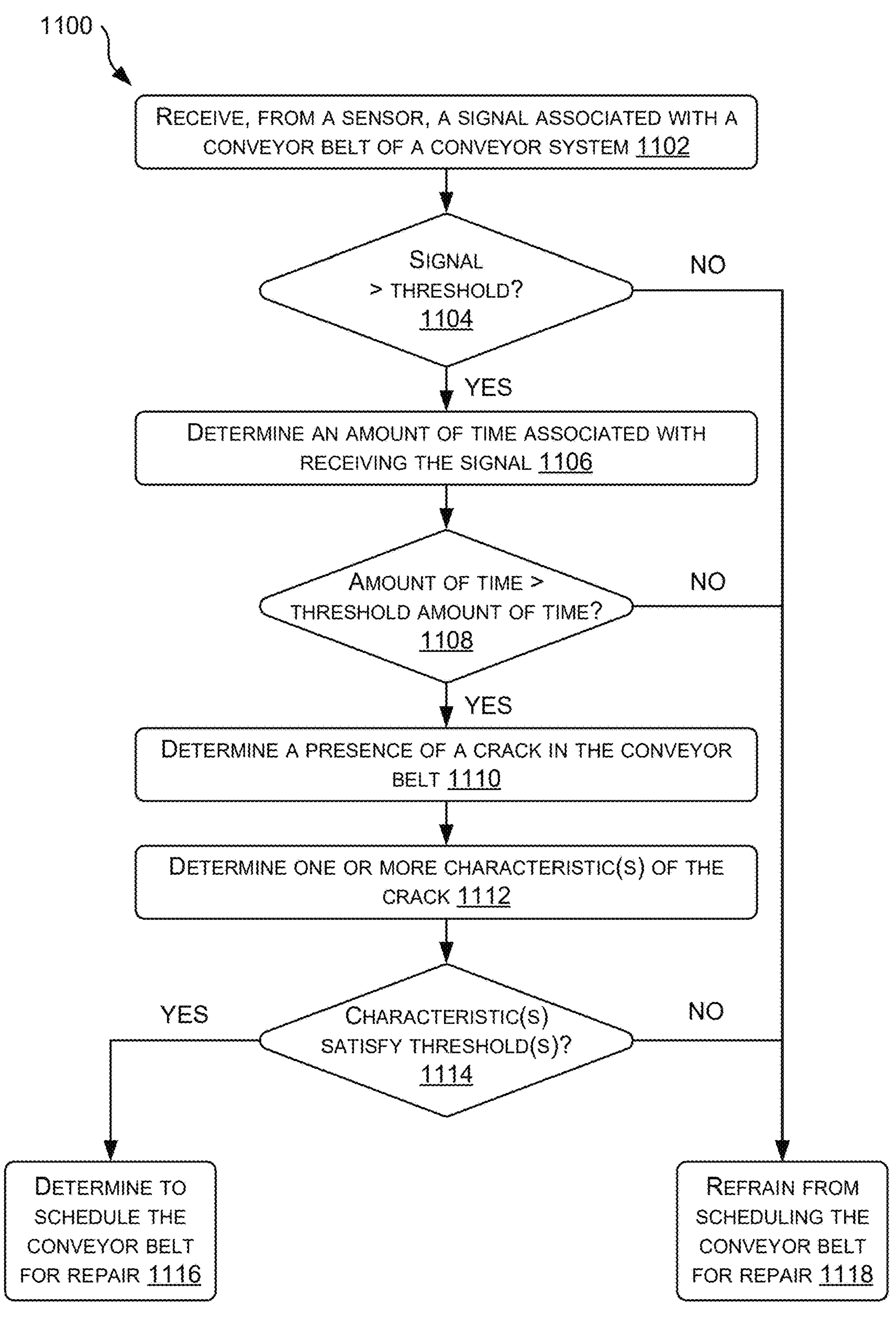
FIG. 11 illustrates an example process associated with determining crack(s) in a conveyor belt based on signal(s) received from a sensor, according to examples of the present disclosure.
Figure 12:
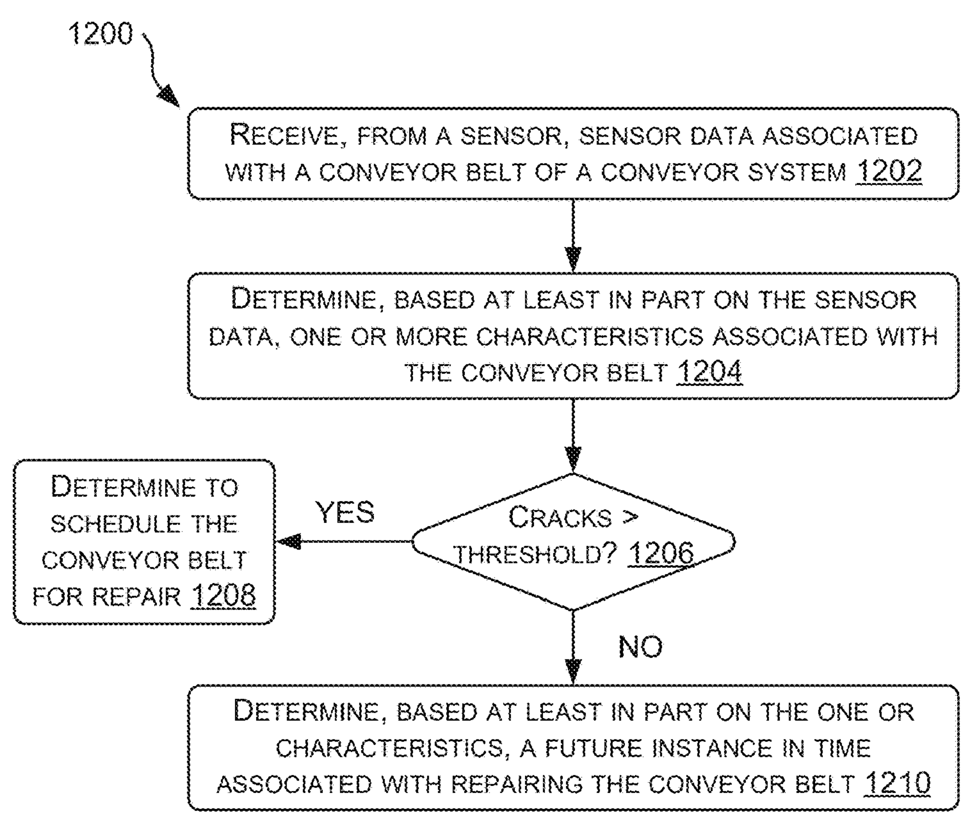
FIG. 12 illustrates an example process associated with determining crack(s) in a conveyor belt, according to examples of the present disclosure.

FIGS. 10-12 illustrate example processes (e.g., methods) related to determining a conveyor belt 104 includes crack(s) 102, according to examples of the present disclosure. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the processes, or alternative processes, and not all of the blocks need be executed. For discussion purposes, the processes are described with reference to the environments, devices, architectures, diagrams, and systems described in the examples herein, such as those described with respect to FIGS. 1-9B, although the processes may be implemented in a wide variety of other environments, architectures, and systems.

FIG. 10 illustrates an example process 1000 associated with determining characteristic(s) 124 of a conveyor belt 104 for determining whether cracks 102 are present, according to examples of the present disclosure.

At 1002, the process 1000 may include determining one or more first characteristic(s) associated with a conveyor system. In some instances, the one or more first characteristic(s) may include a speed of a conveyor belt 104 of the conveyor system 106, a controller 118 associated with the conveyor system 106, or a detection system 100 associated with the conveyor system 106.

At 1004, the process 1000 may include determining a cycle time of a controller associated with the conveyor system. For example, the controller 118 may have a cycle time in which the controller 118 is capable of detecting signals 116 from a sensor 112 arranged adjacent to the conveyor belt 104 to detect the cracks 102. If the cycle time of the controller 118 is greater than the amount of time that the sensor transmits the signal 116, the controller 118 may be unable to detect the signals 116. In some instances, the cycle time may be used to select an appropriate sensor 112 to install on the conveyor system 106, or may be used to replace the controller 118 with another controller 118 that has a faster cycle time.

At 1006, the process 1000 may include receiving, from a sensor, a signal associated with a conveyor belt of the conveyor system. For example, as the conveyor belt 104 operates, the controller 118, or more generally the detection system 100, may receive signals 116 from the sensor 112. The signals 116 received from the sensor 112 may be analog or digital, and may indicate a voltage output by the sensor 112. In some instances, the signals 116 may be received continuously, whether cracks 102 are detected or absent. In some instances, the signals 116 may be received when the conveyor belt 104 extends beyond the displacement position 306. Additionally, the signals 116 may be raw sensor signals generated by the sensor 112, or the signals 116 may have a debounce as added by the sensor 112. In an embodiment, the process 1000 may receive both a debounced signal and a raw signal from the sensor 112.

At 1008, the process 1000 may include determining whether the signal is greater than a threshold. For example, the process 1000 may compare a voltage of the signal 116 to a threshold to determine whether the voltage is greater than the threshold. In some instances, when the conveyor belt 104 includes a crack 102, and the portions of the conveyor belt 104 corresponding to the crack 102 disrupt the light signal output by the sensor 112 (e.g., at the displacement position), the signal 116 may indicate an increase in voltage. However, in some instances, the controller 118 may receive signals 116 from the sensor 112 in instances where the conveyor belt 104 does not extend the minimum displacement 304, when noise is present, and so forth. If at 1008, the process 1000 determines that the signal 116 is greater than the threshold, the process 1000 may follow the "YES" route and proceed to 1010.

At 1010, the process 1000 may include determining an amount of time associated with receiving the signal. For example, the controller 118 may determine an amount of time that the controller 118 received the signal 116, where the signal 116 was greater than the threshold. In some instances, the controller 118 may determine an amount of time between two instances in time (e.g., time $t_1$ and time $t_2$) when the signal 116 was received. In this sense, during the two instances in time, for example, the crack 102 of the conveyor belt 104 may extend past the displacement position 306. Although a single signal is described as being received for determining whether the signal 116 is received for the amount of time, in some instances, multiple signals may be received. For example, multiple signals may be received with a voltage indicative of the displacement 114 of the conveyor belt 104, and the amount of time across the signals 116 may be used to determine how long the displacement 114 was present beyond the displacement position 306.

At 1012, the process 1000 may include determining one or more second characteristic(s) associated with the conveyor belt. For example, based at least in part on the amount of time associated with receiving the signal 116, the process 1000 may determine characteristic(s) 124 of the conveyor belt 104, or the crack 102. For example, a dimension of the crack 102 may be determined based at least in part on the amount of time that the controller 118 received the signal 116. For a smaller crack, the amount of time may be less than a larger crack, given that the larger crack may be displaced beyond the displacement position 306 for a greater amount of time.

At 1014, the process 1000 may include determining whether the second characteristic(s) satisfy one or more threshold(s). For example, even though a crack 102 in the conveyor belt 104 may have been detected, the crack 102 may not be severe enough to warrant replacement or maintenance to the conveyor belt 104. In some instances, a dimension of the crack 102 may be compared against one or more thresholds, such as a length, width, etc. of the crack 102. Additionally, or alternatively, the crack 102 may be characterized (e.g., low, medium, high), and such classification may be compared to a threshold. If at 1014 the process 1000 determines that the second characteristic(s) satisfy the threshold(s), the process 1000 may follow the "YES" route and proceed to 1016.

At 1016, the process 1000 may include determining to schedule the conveyor belt for repair. For example, based at least in part on the characteristic(s) 124 of the conveyor belt 104 satisfying the threshold(s), the process 1000 may determine that the conveyor belt 104 needs repair. In such instances, the detection system 100 may generate the instruction(s) 132, for example, to generate tasks to repair, replace, service, etc. the conveyor belt 104, to reduce a speed of the motor(s) powering the conveyor belt 104, to seek help from personnel working within an environment of the conveyor system 106, and so forth.

At 1018, the process 1000 may include causing a first indication to be output associated with the conveyor system. For example, lighting elements, speakers, etc. associated with the conveyor system 106 may output an indication 128 that indicates the crack 102 in the conveyor belt 104. In some instances, when the presence of the crack 102 is detected, and the conveyor system 106 needs repair, lighting elements at the conveyor system 106 may illuminate to red, yellow, etc. This may signal to personnel operating within an environment of the conveyor system 106 that repair is needed.

Returning to 1008, if the process 1000 determines that the signal 116 is not greater than the threshold, the process 1000 may follow the "NO" route and proceed to 1020. The process 1000 may also proceed to 1020 following the "NO" route from 1014. For example, if the signal 116 was received for a small amount of time, thereby potentially indicating a small crack, the conveyor belt 104 may not need to be repaired. At 1020, the process 1000 may include refraining from scheduling the conveyor belt for repair. For example, although cracks 102 may be present in the conveyor belt 104, the cracks 102 may not be severe enough to warrant replacement or repair of the conveyor belt 104.

At 1022, the process 1000 may include causing a second indication to be output associated with the conveyor system. For example, in instances in which the conveyor belt 104 is not scheduled for repair, the lighting elements of the conveyor system 106 may illuminate to a different color (e.g., green) than when the conveyor belt 104 needs repair. From 1022, the process 1000 may loop to 1006 whereby the process 1000 may continue to receive signals 116 from the sensor 112 for determining whether the conveyor belt 104 includes cracks 102 that warrant repair.

Although the process 1000 is described with regard to characterizing a single crack, the process 1000 may characterize any number of cracks 102 within the conveyor belt 104. For example, it is envisioned that the conveyor belt 104 may include more than one crack 102, and in such instances, the process 1000 may continuously receive the signals 116 for determining whether cracks 102 are present and/or whether the characteristic(s) 124 of the cracks 102 satisfy the threshold for warranting repair. Moreover, although the process 1000 is described for a single conveyor belt 104, the process 1000 may receive signals 116 from sensors 112 disposed across any number of conveyor belts 104, whether within the same or different environment.

In some instances, the process 1000 may determine that the conveyor belt 104 needs to be repaired or replaced based at least in part on detecting that the conveyor belt 104 includes a threshold number of cracks 102. For example, if the conveyor belt 104 includes a threshold number of cracks 102, but the individual cracks 102 themselves do not satisfy the thresholds, the process 1000 may determine that the conveyor belt 104 needs to be replaced or repaired. In this instance, because the conveyor belt 104 may include a plurality of the cracks 102, although the individual cracks 102 alone may not include a dimension greater than the threshold dimension, for example, the cumulative effect of the cracks 102 may necessitate repair or replacement of the conveyor belt 104.

FIG. 11 illustrates an example process 1100 associated with determining crack(s) 102 in a conveyor belt 104 based on signal(s) 116 received from a sensor 112, according to examples of the present disclosure.

At 1102, the process 1100 may include receiving, from a sensor, a signal associated with a conveyor belt of the conveyor system. For example, as the conveyor belt 104 operates, the controller 118, or more generally the detection system 100, may receive signals 116 from the sensor 112. In some instances, the signals 116 may be received from a single sensor, or multiple sensors disposed about the conveyor system 106. The signals 116 received from the sensor 112 may indicate a voltage output by the sensor 112. The signals 116 may be raw sensor signals generated by the sensor 112, or the signals 116 may have a debounce as added by the sensor 112. In some instances, the signals 116 may be received continuously, whether cracks 102 are detected or absent. In some instances, the signals 116 may be received when the conveyor belt 104 extends beyond the displacement position 306 (e.g., disrupting the light curtain).

At 1104, the process 1100 may include determining whether the signal is greater than a threshold. For example, the process 1100 may compare a voltage of the signal 116 to a threshold to determine whether the voltage is greater than the threshold. In some instances, when the conveyor belt 104 includes a crack 102, and the portions of the conveyor belt 104 corresponding to the crack 102 disrupt the light signal output by the sensor 112 (e.g., at the displacement position 306), the signal 116 may indicate an increase in voltage. However, in some instances, the controller 118 may receive signals 116 from the sensor 112 in instances where the conveyor belt 104 does not extend the minimum displacement 304, when noise is present, based on debris in the environment and so forth. If at 1104, the process 1100 determines that the signal 116 is greater than the threshold, the process 1000 may follow the "YES" route and proceed to 1106.

At 1106, the process 1100 may include determining an amount of time associated with receiving the signal. For example, the controller 118 may determine an amount of time that the controller 118 received the signal 116. In some instances, the controller 118 may determine an amount of time between two instances in time (e.g., time $t_1$ and time $t_2$) when the signal 116 was received, or when the signal 116 was greater than the threshold. In this sense, during the two instances in time, for example, the crack 102 of the conveyor belt 104 may extend past the displacement position 306.

At 1108, the process 1100 may include determining whether an amount of time associated with receiving the signal is greater than a threshold amount of time. For example, the controller 118 may determine, using the amount of time that the controller 118 received the signal 116, whether the amount of time was greater than a threshold amount of time. In some instances, the threshold amount of time may be based on the speed 138 of the conveyor belt 104 and/or a cycle time of the controller 118. Such characteristic(s) 124 may characterize the crack 102 based at least in part on the conveyor system 106. For example, if the signal 116 was received for a small amount of time (e.g., 1 millisecond) a crack 102 may have been falsely detected or the crack 102 may be too small to warrant repair. Comparatively, if the signal 116 was received for a larger amount of time (e.g., 10 milliseconds), the crack 102 may be large enough to warrant repair. In some instances, the amount of time may be associated with an amount of time that the conveyor belt 104 is disposed within the detectable area 310 of the sensor 112. If at 1108 the process 1100 determines that the amount of time was greater than the threshold amount of time, the process 1100 may follow the "YES" route and proceed to 1110.

At 1110, the process 1100 may include determining a presence of a crack in the conveyor belt. For example, when the signal 116 was received for greater than the threshold amount of time, the process 1100 may determine a presence of the crack 102.

At 1112, the process 1100 may include determining one or more characteristic(s) of the crack. For example, based at least in part on the amount of time associated with receiving the signal 116, the process 1000 may determine characteristic(s) 124 of the crack 102. For example, a dimension, type, classification, etc. of the crack 102 may be determined based at least in part on the amount of time that the controller 118 received the signal 116.

At 1114, the process 1100 may include determining whether the characteristic(s) satisfy one or more threshold(s). For example, even though a crack 102 in the conveyor belt 104 may have been detected, the crack 102 may not be severe enough to warrant replacement or maintenance to the conveyor belt 104. In some instances, a dimension of the crack 102 may be compared against one or more thresholds, such as a length, width, etc. of the crack 102. Additionally, or alternatively, the crack 102 may be characterized (e.g., low, medium, high), and such classification may be compared to a threshold. If at 114 the process 1100 determines that the characteristic(s) 124 satisfy the threshold(s), the process 1100 may follow the "YES" route and proceed to 1116.

At 1116, the process 1100 may include determining to schedule the conveyor belt for repair. For example, based at least in part on the characteristic(s) 124 of the conveyor belt 104 satisfying the threshold(s), the process 1100 may determine that the conveyor belt 104 needs repair. In such instances, the detection system 100 may generate the instruction(s) 132, for example, to generate tasks to repair, replace, service, etc. the conveyor belt 104, to reduce a speed of the motor(s) powering the conveyor belt 104, to seek help from personnel working within an environment of the conveyor system 106, and so forth.

Returning to 1104, if the process 1100 determines that the signal 116 is not greater than the threshold, the process 1100 may follow the "NO" route and proceed to 1118. The process 1100 may also proceed to 1118 following the "NO" route from 1108 or 1114. For example, if the signal 116 was received for a small amount of time, thereby potentially indicating a small crack, the conveyor belt 104 may not need to be repaired. At 1118, the process 1000 may include refraining from scheduling the conveyor belt for repair. For example, although cracks 102 may be present in the conveyor belt 104, the cracks 102 may not be severe enough to warrant replacement or repair of the conveyor belt 104.

FIG. 12 illustrates an example process 1200 associated with determining crack(s) 102 in a conveyor belt 104, according to examples of the present disclosure.

At 1202, the process 1200 may include receiving sensor data associated with a conveyor belt of a conveyor system. For example, a sensor 112 may be arranged proximate to a pulley 300 of the conveyor system 106, at a location where the conveyor belt 104 rounds over the pulley 300. In some instances, the sensor 112 is arranged to detect, or determine, displacements of the conveyor belt 104 away from a standard position 302. In some instances, the sensor data 144 may be received from a single, or multiple, sensors. Example sensors include photoelectric sensors, ultrasonic sensors, cameras, and so forth.

At 1204, the process 1200 may include determining, based at least in part on the sensor data, one or more characteristic(s) of the conveyor belt. For example, the sensor data 144 may be analyzed to determine displacements of the conveyor belt 104 away from the standard position 302. In some instances, based on the displacement 114, the process 1200 may determine a width, length, type, classification, etc. associated with the displacement 114.

At 1206, the process 1200 may include determining whether any cracks are present in the conveyor belt and whether the cracks satisfy a threshold. For example, based at least in part on the characteristic(s) 124, the process 1200 may determine whether any cracks 102 are present. In some instances, whether any crack(s) 102 are present may be based at least in part on whether the cracks 102 include a threshold width, length, etc. More generally, when portions of the conveyor belt 104 are displaced beyond the standard position 302, and past the displacement position 306, for example, the process 1200 may determine that cracks 102 are present. If at 1206 the process 1200 determines that cracks 102 are present, the process 1200 may follow the "YES" route and proceed to 1208.

At 1208, the process 1200 may include determining to schedule the conveyor belt for repair. For example, based at least in part on the cracks 102 satisfying the threshold, the process 1200 may determine that the conveyor belt 104 needs repair. In such instances, the detection system 100 may generate the instruction(s) 132, for example, to generate tasks to repair, replace, service, etc, the conveyor belt 104, to reduce a speed of the motor(s) powering the conveyor belt 104, to seek help from personnel working within an environment of the conveyor system 106, and so forth.

Alternatively, if at 1206 the process 1200 determines that the cracks 102 are not greater than the threshold, the process 1200 may follow the "NO" route and proceed to 1210. At 1210, the process 1200 may include determining, based at least in part on the one or more characteristic(s), a future instance in time associated with repairing the conveyor belt. For example, even though the cracks 102 may not satisfy the threshold, using the characteristic(s) 124 of the crack 102 (e.g., length, width, etc.), the process 1200 may determine when the conveyor belt 104 will need to be repaired. In some instances, the future instance in time when the conveyor belt 104 will need to be repaired may be based on a cycle time and/or speed 138 of the conveyor belt 104.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:

determining, for a conveyor belt of a conveyor system, a standard position of the conveyor belt as the conveyor belt rounds over a pulley of the conveyor system;

receiving, from a sensor arranged adjacent to the pulley, a first signal associated with the conveyor belt;

determining, based on the first signal, a first displacement of the conveyor belt from the standard position;

determining, based on the first displacement, a presence of a first crack in the conveyor belt;

determining that the first displacement of the first crack fails to satisfy a threshold displacement associated with repairing the conveyor belt;

receiving, from the sensor, a second signal associated with the conveyor belt;

determining, based on the second signal, a second displacement of the conveyor belt from the standard position;

determining, based on the second displacement, a presence of a second crack in the conveyor belt, the second crack being different than the first crack;

determining that the second displacement of the second crack satisfies the threshold displacement associated with repairing the conveyor belt; and generating, based on the second crack satisfying the threshold displacement, an indication associated with repairing the conveyor belt.

2. The method of claim 1, further comprising:

determining a first amount of time associated with receiving the first signal;

determining, based on the first amount of time, that the first displacement of the first crack fails to satisfy the threshold displacement;

determining a second amount of time associated with receiving the second signal; and determining, based on the second amount of time, that the second displacement of the second crack satisfies the threshold displacement.

3. The method of claim 1, further comprising:

determining, based on the first displacement, a first dimension of the first crack;

determining that the first dimension fails to satisfy a threshold dimension associated with repairing the conveyor belt;

determining, based on the second displacement, a second dimension of the second crack; and determining that the second dimension satisfies the threshold dimension associated with repairing the conveyor belt.

4. The method of claim 1, further comprising:

causing, based on the first displacement failing to satisfy the threshold displacement, output of a second indication at the conveyor system; and causing, based on the second displacement satisfying the threshold displacement, output of a third indication at the conveyor system, the third indication being different than the second indication.

5. A method comprising:

determining a standard position of a conveyor belt as the conveyor belt rounds over a pulley;

determining, based at least in part on the standard position, a displacement position associated with detecting displacements of the conveyor belt as the conveyor belt rounds over the pulley;

receiving a signal from a sensor arranged adjacent to the pulley;

determining that the signal is associated with a displacement of the conveyor belt beyond the displacement position;

determining, based at least in part on the signal, that the displacement is associated with a crack in the conveyor belt;

determining an amount of time associated with receiving the signal;

determining one or more characteristics associated with the crack, wherein the one or more characteristics are based at least in part on the amount of time; and causing output of an indication associated with the crack.

6. The method of claim 5, further comprising determining an amount of time associated with the displacement of the conveyor belt, and wherein the one or more characteristics are further based at least in part on the amount of time.

7. The method of claim 5, wherein the one or more characteristics include at least one of a dimension of the crack, a type of the crack, or a location of the crack along the conveyor belt.

8. The method of claim 5, further comprising determining that the one or more characteristics satisfy a threshold associated with repairing the conveyor belt, and wherein the indication is associated with repairing the conveyor belt.

9. The method of claim 5, further comprising determining that the one or more characteristics fail to satisfy a threshold associated with repairing or replacing the conveyor belt, and wherein the indication is associated with refraining from repairing or replacing the conveyor belt.

10. The method of claim 5, further comprising:

determining a speed of the conveyor belt; and determining, based at least in part on the one or more characteristics and the speed of the conveyor belt, a future instance in time associated with repairing or replacing the conveyor belt.

11. The method of claim 5, further comprising:

receiving a second signal from the sensor;

determining that the second signal is associated with a second displacement of the conveyor belt beyond the displacement position, the second displacement being different than the displacement;

determining, based at least in part on the second signal, that the second displacement is associated with a second crack in the conveyor belt;

determining one or more second characteristics associated with the second crack; and causing output of a second indication associated with the second crack.

12. The method of claim 11, further comprising:

determining, based at least in part on the one or more characteristics, to refrain from repairing or replacing the conveyor belt based at least in part on the crack; and determining, based at least in part on the one or more second characteristics, to repair or replace the conveyor belt based at least in part on the second crack.

13. The method of claim 5, wherein the displacement position is based at least in part on at least one of a speed of the conveyor belt or the sensor.

14. The method of claim 5, further comprising:

receiving a second signal from the sensor;

determining that the second signal is associated with a second displacement of the conveyor belt beyond the standard position;

determining that the second displacement of the conveyor belt is less than the displacement position; and determining, based at least in part on the second displacement being less than displacement position, that the second displacement is associated with an absence of a second crack in the conveyor belt.

15. A system comprising:

a sensor;

one or more processors; and one or more computer-readable media storing executable instructions which, when executed using the one or more processors, cause the one or more processors to perform operations comprising:

receiving, from the sensor, data associated with a displacement of a portion of a conveyor belt from a first position to a second position, determining, based at least in part on the data, that the displacement corresponds to a crack in the conveyor belt, determining an amount of time associated with the portion of the conveyor belt being displaced to or beyond the second position, determining, based at least in part on the amount of time, one or more characteristics of the crack, and causing, based at least in part on the one or more characteristics, output of an indication associated with the crack.

16. The system of claim 15, the operations further comprising determining that the one or more characteristics satisfy a threshold associated with repairing or replacing the conveyor belt, and wherein the indication is associated with repairing or replacing the conveyor belt.

17. The system of claim 15, wherein the one or more characteristics include at least one of a dimension of the crack, a type of the crack, or a location of the crack along the conveyor belt.

18. The system of claim 15, the operations further comprising:

receiving, from the sensor, second data associated with a second displacement of a second portion of the conveyor belt from the first position to the second position, determining, based at least in part on the second data, that the second displacement corresponds to a second crack in the conveyor belt, determining a second amount of time associated the second portion of the conveyor belt being displaced to or beyond the second position, determining, based at least in part on the second amount of time, one or more second characteristics of the second crack, and causing, based at least in part on the one or more second characteristics, output of a second indication associated with the second crack.

19. The system of claim 15, wherein the second position is based at least in part on at least one of the sensor or a speed of the conveyor belt.

* * * * *